United States Patent
Brown et al.

(10) Patent No.: US 11,683,396 B2
(45) Date of Patent: *Jun. 20, 2023

(54) EFFICIENT CONTEXT MONITORING

(71) Applicant: Apple Inc., Cupertino, CA (US)

(72) Inventors: Alexander Barraclough Brown, Mountain View, CA (US); Umesh S. Vaishampayan, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/195,847

(22) Filed: Mar. 9, 2021

(65) Prior Publication Data
US 2021/0289043 A1 Sep. 16, 2021

Related U.S. Application Data

(63) Continuation of application No. 16/727,233, filed on Dec. 26, 2019, now Pat. No. 10,986,211, which is a
(Continued)

(51) Int. Cl.
*H04L 29/08* (2006.01)
*H04L 67/63* (2022.01)
(Continued)

(52) U.S. Cl.
CPC ............ *H04L 67/63* (2022.05); *G06F 8/61* (2013.01); *G06F 9/445* (2013.01); *G06F 9/461* (2013.01);
(Continued)

(58) Field of Classification Search
CPC .. G06F 3/0488; G06F 9/4451; G06F 16/3349; G05B 23/0229; G06Q 30/0251;
(Continued)

(56) References Cited

U.S. PATENT DOCUMENTS 6,266,781 B1 7/2001 Chung et al.
6,453,430 B1 9/2002 Singh et al.
(Continued)

FOREIGN PATENT DOCUMENTS

CN 101167068 A 4/2008
CN 102077539 A 5/2011
(Continued)

OTHER PUBLICATIONS

Anonymous: "Local and Remote Notification Programming Guide", Mar. 9, 2015, pp. 1-67, Retrieved from the Internet: URL:https://web.archive.org/web/20150320231900/https:developer.aplle.com/library/ios/documetation/NetworkingInternet/conceptual/RemoteNotificationsPG/RemoteNotificationPG.pdf.
(Continued)

*Primary Examiner* — Dustin Nguyen
(74) *Attorney, Agent, or Firm* — Invoke

(57) ABSTRACT

Disclosed are systems, methods, and non-transitory computer-readable storage media for efficiently monitoring the operating context of a computing device. In some implementations, the context daemon and/or the context client can be terminated to conserve system resources. For example, if the context daemon and/or the context client are idle, they can be shutdown to conserve battery power or free other system resources (e.g., memory). When an event occurs (e.g., a change in current context) that requires the context daemon and/or the context client to be running, the context daemon and/or the context client can be restarted to handle the event. Thus, system resources can be conserved while still providing relevant context information collection and callback notification features.

20 Claims, 26 Drawing Sheets

Related U.S. Application Data continuation of application No. 15/151,338, filed on May 10, 2016, now Pat. No. 10,594,835.

(60) Provisional application No. 62/171,892, filed on Jun. 5, 2015.

(51) Int. Cl.

| | | |
|---|---|---|
| *H04W 24/02* | (2009.01) | |
| *G06F 9/445* | (2018.01) | |
| *G06F 11/30* | (2006.01) | |
| *H04L 67/14* | (2022.01) | |
| *G06F 9/46* | (2006.01) | |
| *H04L 67/55* | (2022.01) | |
| *G06N 7/01* | (2023.01) | |
| *G06F 8/61* | (2018.01) | |
| *G06F 9/54* | (2006.01) | |
| *H04W 52/02* | (2009.01) | |

(52) U.S. Cl.
CPC .............. *G06F 9/542* (2013.01); *G06F 9/546* (2013.01); *G06F 11/30* (2013.01); *G06N 7/01* (2023.01); *H04L 67/14* (2013.01); *H04L 67/55* (2022.05); *H04W 24/02* (2013.01); *H04W 52/0264* (2013.01); *Y02D 10/00* (2018.01); *Y02D 30/70* (2020.08)

(58) Field of Classification Search
CPC ...... G06Q 30/0254; G08G 1/01; G06N 7/005; G06N 5/02
See application file for complete search history.

(56) References Cited

U.S. PATENT DOCUMENTS

| | | | |
|---|---|---|---|
| 6,859,829 | B1 | 2/2005 | Parupudi et al. |
| 6,993,556 | B1 | 1/2006 | Seliger et al. |
| 6,996,441 | B1 | 2/2006 | Tobias |
| 7,065,575 | B1 | 6/2006 | Machiraju et al. |
| 7,209,916 | B1 | 4/2007 | Seshadri et al. |
| 7,376,723 | B2 | 5/2008 | Cho et al. |
| 7,392,044 | B2 | 6/2008 | Hayes et al. |
| 7,562,234 | B2 | 7/2009 | Conroy et al. |
| 7,698,276 | B2 | 4/2010 | Seshadri et al. |
| 7,949,888 | B2 | 5/2011 | Cox et al. |
| 8,126,993 | B2 | 2/2012 | Carraher et al. |
| 8,170,547 | B1 | 5/2012 | Bhan et al. |
| 8,231,057 | B1 | 7/2012 | Buentello et al. |
| 8,260,911 | B2 | 9/2012 | Xu et al. |
| 8,305,728 | B2 | 11/2012 | Lee et al. |
| 8,321,057 | B2 | 11/2012 | Maly |
| 8,327,349 | B2 | 12/2012 | Chu et al. |
| 8,407,306 | B1 | 3/2013 | Nerieri et al. |
| 8,510,569 | B2 | 8/2013 | Smith et al. |
| 8,683,037 | B2 | 3/2014 | Wyld et al. |
| 8,693,391 | B2 | 4/2014 | Garcia-Martin et al. |
| 8,775,631 | B2 | 7/2014 | Luna |
| 8,874,026 | B2 | 10/2014 | Anstandig et al. |
| 8,874,781 | B2 | 10/2014 | Khorashadi et al. |
| 8,887,091 | B2 | 11/2014 | Yamaji et al. |
| 8,887,182 | B2 | 11/2014 | Low et al. |
| 8,904,216 | B2 | 12/2014 | Cullimore |
| 8,996,332 | B2 | 3/2015 | Kahn et al. |
| 9,032,321 | B1 * | 5/2015 | Cohen ................... G06F 3/0488 715/771 |
| 9,038,134 | B1 | 5/2015 | Ackerman et al. |
| 9,049,250 | B2 | 6/2015 | Morse et al. |
| 9,158,604 | B1 | 10/2015 | Christodorescu et al. |
| 9,218,468 | B1 | 12/2015 | Rappaport |
| 9,727,747 | B1 | 8/2017 | Kim et al. |
| 9,979,591 | B2 | 5/2018 | Babu |
| 10,015,178 | B2 | 7/2018 | Schulman et al. |
| 2002/0046230 | A1 | 4/2002 | Dieterich et al. |
| 2002/0080155 | A1 | 6/2002 | Abbott et al. |
| 2002/0087643 | A1 | 7/2002 | Parsons et al. |
| 2002/0184295 | A1 | 12/2002 | Bartley |
| 2003/0047604 | A1 | 3/2003 | McClure et al. |
| 2003/0067386 | A1 | 4/2003 | Skinner |
| 2003/0088594 | A1 | 5/2003 | Hamadi |
| 2003/0131141 | A1 | 7/2003 | Springmeyer et al. |
| 2003/0182394 | A1 | 9/2003 | Ryngler et al. |
| 2003/0200264 | A1 | 10/2003 | Brill |
| 2004/0044721 | A1 | 3/2004 | Song et al. |
| 2004/0128663 | A1 | 7/2004 | Rotem |
| 2004/0188511 | A1 | 9/2004 | Sprigg et al. |
| 2004/0193678 | A1 | 9/2004 | Trufinescu et al. |
| 2005/0027584 | A1 | 2/2005 | Fusari |
| 2005/0120389 | A1 | 6/2005 | Boss et al. |
| 2005/0125701 | A1 | 6/2005 | Hensbergen et al. |
| 2005/0154711 | A1 | 7/2005 | McConnell |
| 2005/0219120 | A1 | 10/2005 | Chang |
| 2005/0252963 | A1 | 11/2005 | Adams et al. |
| 2006/0031371 | A1 | 2/2006 | Uthe |
| 2006/0106743 | A1 * | 5/2006 | Horvitz .................. G06N 7/005 706/21 |
| 2006/0168014 | A1 | 7/2006 | Wang |
| 2006/0242694 | A1 | 10/2006 | Gold et al. |
| 2006/0271827 | A1 | 11/2006 | Cascaval et al. |
| 2007/0022380 | A1 | 1/2007 | Swartz et al. |
| 2007/0067373 | A1 | 3/2007 | Higgins et al. |
| 2007/0076646 | A1 | 4/2007 | Foster |
| 2007/0185933 | A1 | 8/2007 | Dao et al. |
| 2008/0004793 | A1 * | 1/2008 | Horvitz .................... G08G 1/01 701/487 |
| 2008/0114574 | A1 | 5/2008 | Chen et al. |
| 2008/0248789 | A1 | 10/2008 | Song et al. |
| 2008/0249969 | A1 | 10/2008 | Tsui et al. |
| 2009/0165132 | A1 | 6/2009 | Jain et al. |
| 2009/0199029 | A1 | 8/2009 | Arimilli et al. |
| 2009/0232480 | A1 | 9/2009 | Jendbro |
| 2009/0240947 | A1 | 9/2009 | Goyal et al. |
| 2009/0254912 | A1 | 10/2009 | Roundtree et al. |
| 2009/0281817 | A1 | 11/2009 | Ferrara et al. |
| 2009/0282130 | A1 | 11/2009 | Antoniou et al. |
| 2009/0287433 | A1 | 11/2009 | Houston et al. |
| 2010/0015926 | A1 | 1/2010 | Luff |
| 2010/0216434 | A1 | 8/2010 | Marcelling et al. |
| 2010/0241888 | A1 | 9/2010 | Kaneko et al. |
| 2010/0293049 | A1 | 11/2010 | Maher et al. |
| 2010/0332876 | A1 | 12/2010 | Fields et al. |
| 2011/0016476 | A1 | 1/2011 | Raju |
| 2011/0029598 | A1 | 2/2011 | Arnold et al. |
| 2011/0060996 | A1 | 3/2011 | Alberth et al. |
| 2011/0195699 | A1 | 8/2011 | Tadayon et al. |
| 2012/0023226 | A1 | 1/2012 | Petersen et al. |
| 2012/0042002 | A1 | 2/2012 | Smith et al. |
| 2012/0102499 | A1 | 4/2012 | Flemming et al. |
| 2012/0117390 | A1 | 5/2012 | Arndt et al. |
| 2012/0130806 | A1 * | 5/2012 | Partridge ........... G06Q 30/0251 705/14.49 |
| 2012/0135756 | A1 | 5/2012 | Rosso et al. |
| 2012/0154633 | A1 | 6/2012 | Rodriguez |
| 2012/0164982 | A1 | 6/2012 | Klein |
| 2012/0173610 | A1 | 7/2012 | Bleau et al. |
| 2012/0179502 | A1 | 7/2012 | Farooq et al. |
| 2012/0197651 | A1 | 8/2012 | Robinson et al. |
| 2012/0209946 | A1 | 8/2012 | McClure et al. |
| 2012/0210415 | A1 | 8/2012 | Somani et al. |
| 2012/0290740 | A1 | 11/2012 | Tewari et al. |
| 2012/0316774 | A1 | 12/2012 | Yariv et al. |
| 2012/0324248 | A1 | 12/2012 | Schluessler et al. |
| 2013/0006719 | A1 | 1/2013 | Green et al. |
| 2013/0046719 | A1 | 2/2013 | Sogo |
| 2013/0047034 | A1 | 2/2013 | Salomon et al. |
| 2013/0067492 | A1 | 3/2013 | Fidler et al. |
| 2013/0080641 | A1 | 3/2013 | Lui et al. |
| 2013/0084896 | A1 | 4/2013 | Barkie et al. |
| 2013/0091544 | A1 | 4/2013 | Oberheide et al. |
| 2013/0097605 | A1 | 4/2013 | Martinka et al. |
| 2013/0102298 | A1 | 4/2013 | Goodman et al. |
| 2013/0110943 | A1 | 5/2013 | Menon et al. |
| 2013/0170348 | A1 | 7/2013 | Luna et al. |

(56) References Cited

U.S. PATENT DOCUMENTS

| | | |
|---|---|---|
| 2013/0179267 A1 | 7/2013 | Lee |
| 2013/0183935 A1 | 7/2013 | Holostov et al. |
| 2013/0191544 A1 | 7/2013 | Caldeira et al. |
| 2013/0204944 A1 | 8/2013 | Robinson et al. |
| 2013/0204948 A1 | 8/2013 | Zeyliger et al. |
| 2013/0226856 A1 | 8/2013 | Zhang et al. |
| 2013/0227261 A1 | 8/2013 | Anderson et al. |
| 2013/0238540 A1* | 9/2013 | O'Donoghue ..... G06Q 30/0254 706/46 |
| 2013/0267254 A1 | 10/2013 | Zhang |
| 2013/0275994 A1 | 10/2013 | Uola et al. |
| 2013/0303195 A1 | 11/2013 | Bahl et al. |
| 2013/0311411 A1* | 11/2013 | Senanayake ........ G06F 16/3349 703/22 |
| 2013/0329562 A1 | 12/2013 | Murakami |
| 2013/0332524 A1 | 12/2013 | Fiala et al. |
| 2014/0019398 A1* | 1/2014 | Engel ...................... G06N 5/02 706/46 |
| 2014/0067779 A1 | 3/2014 | Ojha |
| 2014/0068207 A1 | 3/2014 | Aslot et al. |
| 2014/0075234 A1 | 3/2014 | Stekkelpak et al. |
| 2014/0082383 A1 | 3/2014 | De et al. |
| 2014/0082501 A1 | 3/2014 | Bae et al. |
| 2014/0085138 A1 | 3/2014 | Williams |
| 2014/0095874 A1 | 4/2014 | Desai et al. |
| 2014/0115146 A1 | 4/2014 | Johnson et al. |
| 2014/0117921 A1 | 5/2014 | Suomela |
| 2014/0123022 A1 | 5/2014 | Lee et al. |
| 2014/0128105 A1 | 5/2014 | Su et al. |
| 2014/0143791 A1 | 5/2014 | Mark et al. |
| 2014/0153457 A1 | 6/2014 | Liu |
| 2014/0156834 A1 | 6/2014 | Wyld et al. |
| 2014/0163849 A1 | 6/2014 | Adam et al. |
| 2014/0164074 A1 | 6/2014 | Theo |
| 2014/0200691 A1 | 7/2014 | Lee et al. |
| 2014/0201315 A1 | 7/2014 | Jacob et al. |
| 2014/0343946 A1 | 11/2014 | Torok et al. |
| 2014/0362768 A1 | 12/2014 | Wood et al. |
| 2014/0364104 A1 | 12/2014 | Wood et al. |
| 2014/0366041 A1 | 12/2014 | Stanley-Marbell et al. |
| 2014/0366042 A1 | 12/2014 | Chan et al. |
| 2015/0004998 A1 | 1/2015 | Pennanen et al. |
| 2015/0031312 A1 | 1/2015 | Wang et al. |
| 2015/0088422 A1 | 3/2015 | Nikovski et al. |
| 2015/0134392 A1 | 5/2015 | Wagoner |
| 2015/0153810 A1 | 6/2015 | Sasidharan et al. |
| 2015/0189631 A1 | 7/2015 | He et al. |
| 2015/0208219 A1 | 7/2015 | Bowers et al. |
| 2015/0256993 A1 | 9/2015 | Bellamkonda et al. |
| 2015/0264557 A1 | 9/2015 | Exterman |
| 2015/0324698 A1 | 11/2015 | Karaoguz et al. |
| 2015/0350885 A1 | 12/2015 | Stanley-Marbell et al. |
| 2016/0014554 A1 | 1/2016 | Sen et al. |
| 2016/0171577 A1 | 6/2016 | Robinson et al. |
| 2016/0249289 A1 | 8/2016 | Threlkeld et al. |
| 2016/0350671 A1* | 12/2016 | Morris, II .......... G05B 23/0229 |
| 2020/0137193 A1 | 4/2020 | Vaishampayan et al. |

FOREIGN PATENT DOCUMENTS

| | | | |
|---|---|---|---|
| CN | 102866921 A | 1/2013 | |
| EP | 2328324 A1 | 6/2011 | |
| EP | 2568384 A1 | 3/2013 | |
| GB | 2380830 A | 4/2003 | |
| JP | 2008-507015 A | 3/2008 | |
| KR | 10-2005-0022010 A | 3/2005 | |
| KR | 10-2010-0032901 A | 3/2010 | |
| KR | 10-2011-0082585 A | 7/2011 | |
| KR | 10-2012-0037988 A | 4/2012 | |
| KR | 10-2014-0015159 A | 2/2014 | |
| TW | I254239 B | 5/2006 | |
| TW | I272527 B | 2/2007 | |
| TW | I375906 B | 11/2012 | |
| TW | I389032 B | 3/2013 | |
| TW | 201504805 A | 2/2015 | |
| WO | WO-2007005464 A2 * | 1/2007 | ............ G06N 7/005 |
| WO | 2007/091256 A2 | 8/2007 | |
| WO | 2013/024279 A1 | 2/2013 | |
| WO | WO-2013057155 A1 * | 4/2013 | ........... G06F 9/4451 |
| WO | 2015/004805 A1 | 1/2015 | |
| WO | 2015/183515 A1 | 12/2015 | |
| WO | 2016/196497 A1 | 12/2016 | |

OTHER PUBLICATIONS

Cho, et al., "A Battery Lifetime Guarantee Scheme for Selective Applications In Smart Mobile Devices," IEEE Transactions on Consumer Electronics, vol. 60, No. 1, Mar. 20, 2014, pp. 155-163.

Hamza Khalid; Limit Usage for any iPhone App by Time, Frequency & More With AppCap; Feb. 12, 2013; 6 pages.

Jungwook et al., "A Battery Lifetime Guarantee Scheme for Selective Applications in Smart Mobile Devices," IEEE Transactions on Consumer Electronics, New York, NY, vol. 60, No. 1, pp. 155-163, Feb. 2014.

Oliner et al., "Carat: Collaborative Energy Diagnosis for Mobile Devices," Sensys'13, pp. 1-16, Nov. 11, 2013.

Shin et al., "Understanding and Prediction of Mobile Application Usage for Smart Phones," Ubiquitous Computing, ACM, New York, NY, pp. 173-182, Sep. 5, 2012.

Yan, Tingxin et al., "Fast App Launching for Mobile Devices Using Predictive User Context", University of Massachusetts Amherst, Microsoft Research, MobiSys 12, Jun. 25-29, 2012, Low Wood Bay, Lake District, UK, Copyright 2012, ACM 978-1-4503-1301, BNSDOCID:<XP.sub.-55106616A.sub.-1>, 14 pages.

\* cited by examiner

200

```
Locked: false
Headphones in: false
Charging: false
Bluetooth: false
App in Focus: social
```

```
Locked: true
Headphones in: false
Charging: true
Bluetooth: on
App in Focus: music
Location: home
```

| | Request ID | Client ID | Predicate | Callback Condition |
|---|---|---|---|---|
| 302 | 1 | Client_ID1 | locked == true AND app in focus == music | Immediately |
| 304 | 2 | Client_ID2 | locked == false AND location == home | Immediately |
| 306 | 3 | Client_ID3 | sleep == true | 30 minutes before |
| 308 | 4 | Client_ID4 | locked == false AND charging == true | Immediately |
| 310 | 5 | Client_ID5 | wake == true | 5 minutes after |
| 312 | 6 | Client_ID6 | sleep == true | 10 minutes after |
| 314 | 7 | Client_ID7 | location == home OR location == work | Immediately |
| 316 | 8 | Client_ID8 | meeting == true | 30 minutes before |

FIG. 3

| Event Stream | Event Metadata | | |
|---|---|---|---|
| Locked | start:TS; duration:D; locked:true | start:TS; duration:D; locked:false | |
| Headphones | start:TS; duration:D; | start:TS; duration:D; | start:TS; duration:D; |
| Charging | start:TS; duration:D; charging:yes; beginLevel:5%; endLevel:90% | | |
| Bluetooth | start:TS; duration:D; BT:on; type:speaker; mediaSource:music | | |
| App in Focus | start:TS; duration:D; name:social | start:TS; duration:D; name:music | |
| Location | start:TS; duration:D; name:home | start:TS; duration:D; name:work | |
| Sleeping | start:TS; duration:D | start:TS; duration:D | start:TS; duration:D |

FIG. 6

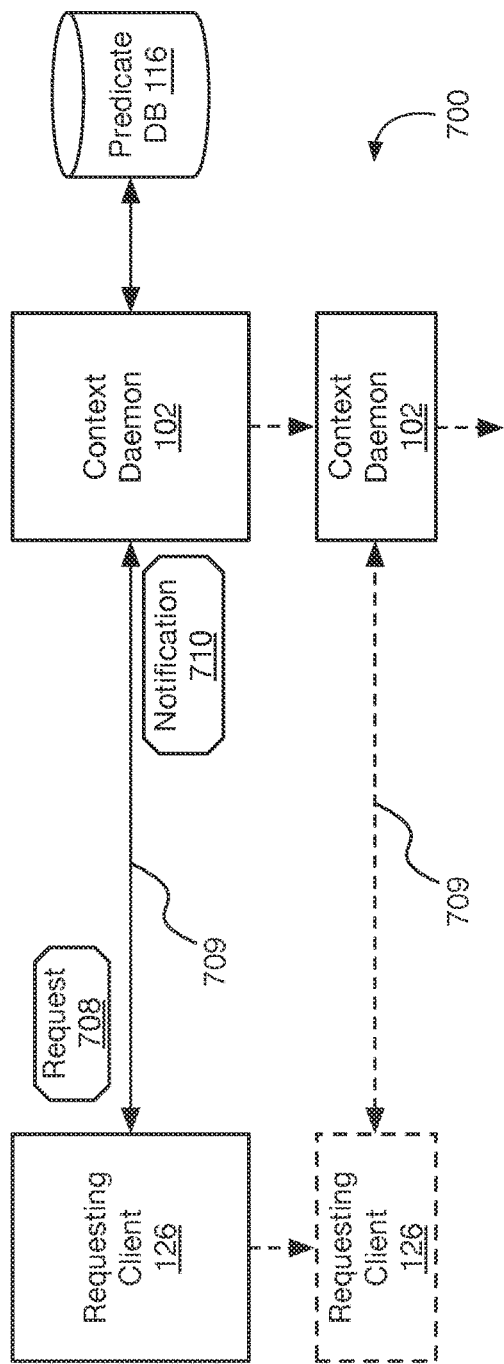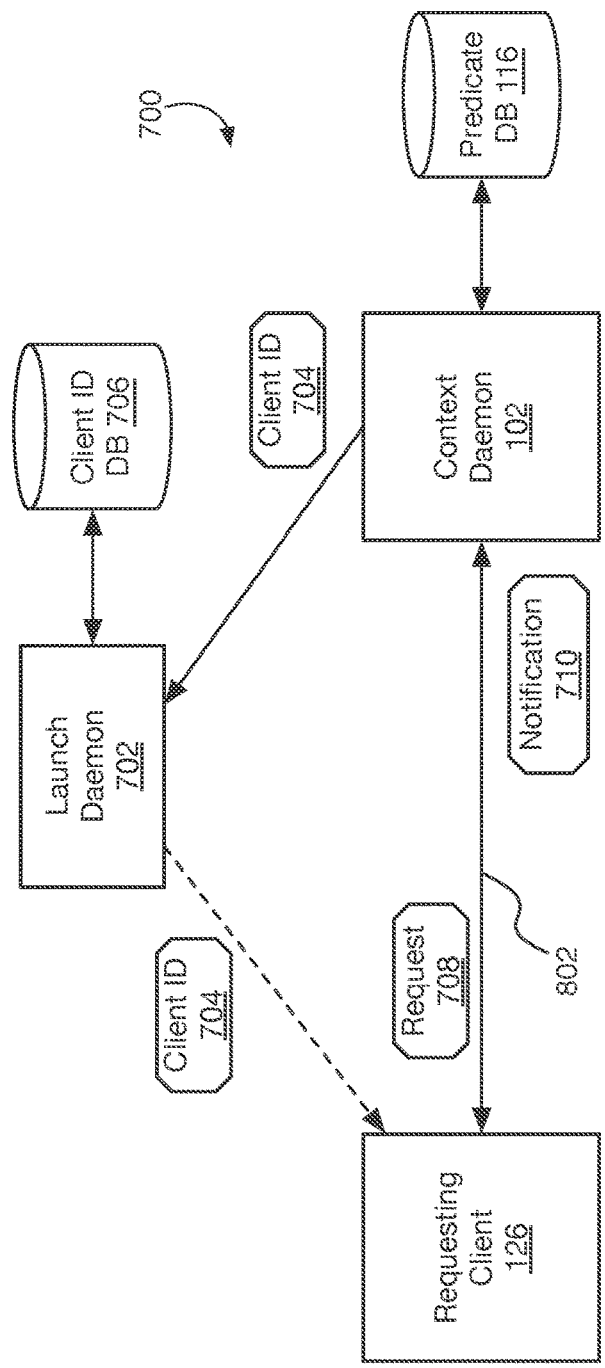
FIG. 8A
FIG. 8B

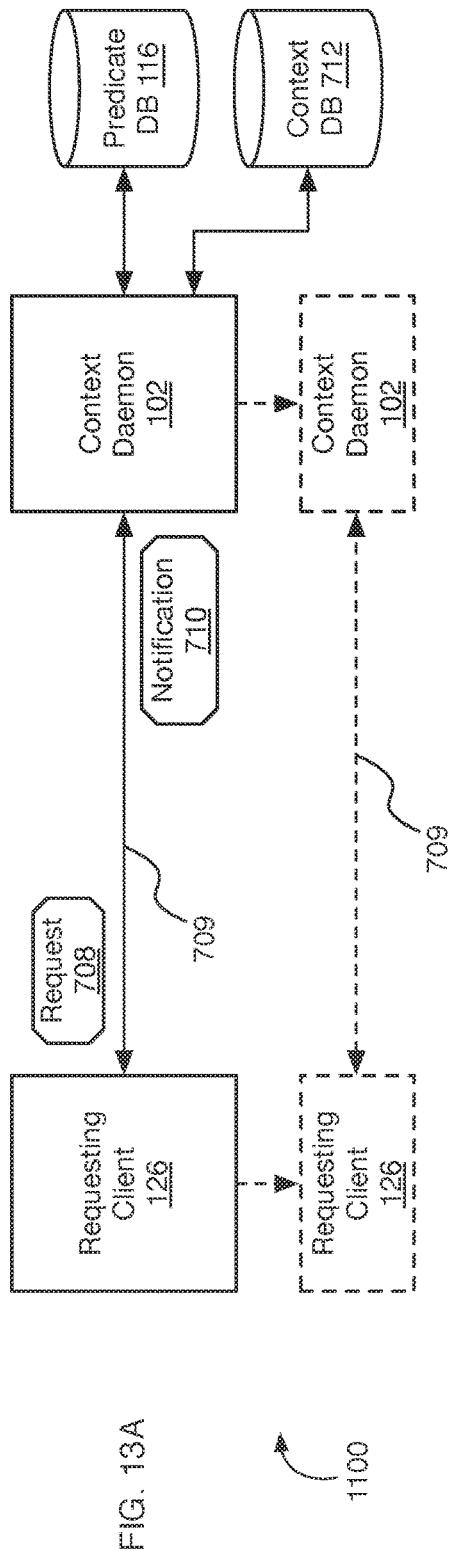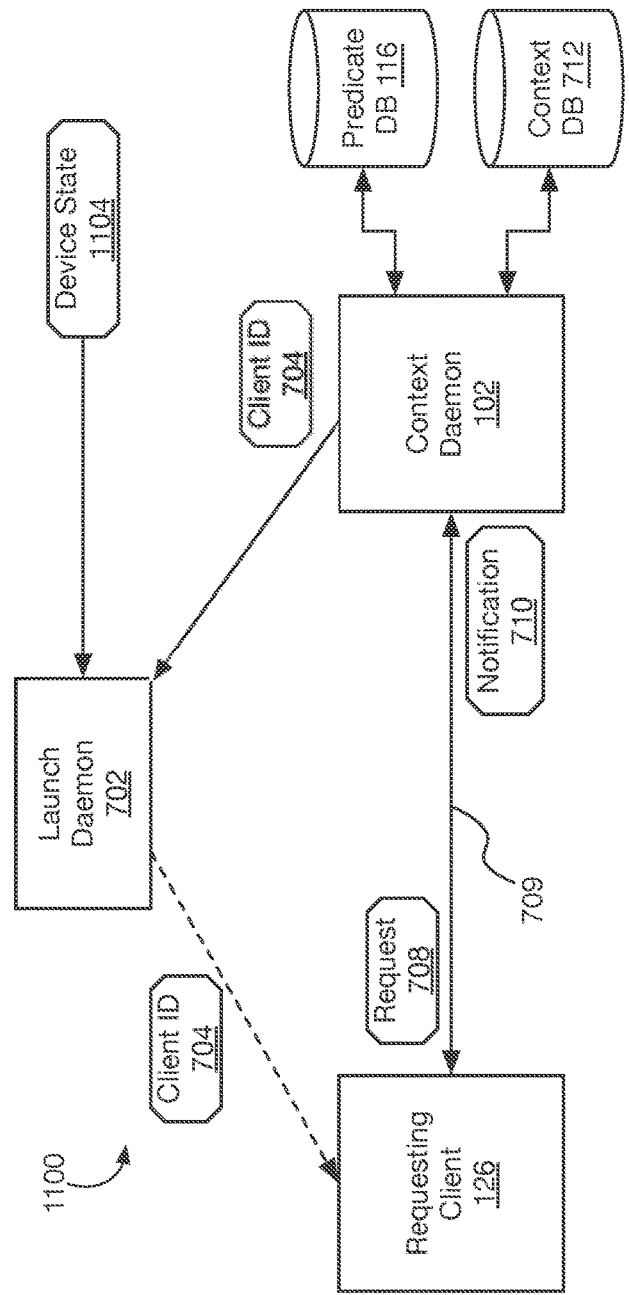
FIG. 13A
FIG. 13B

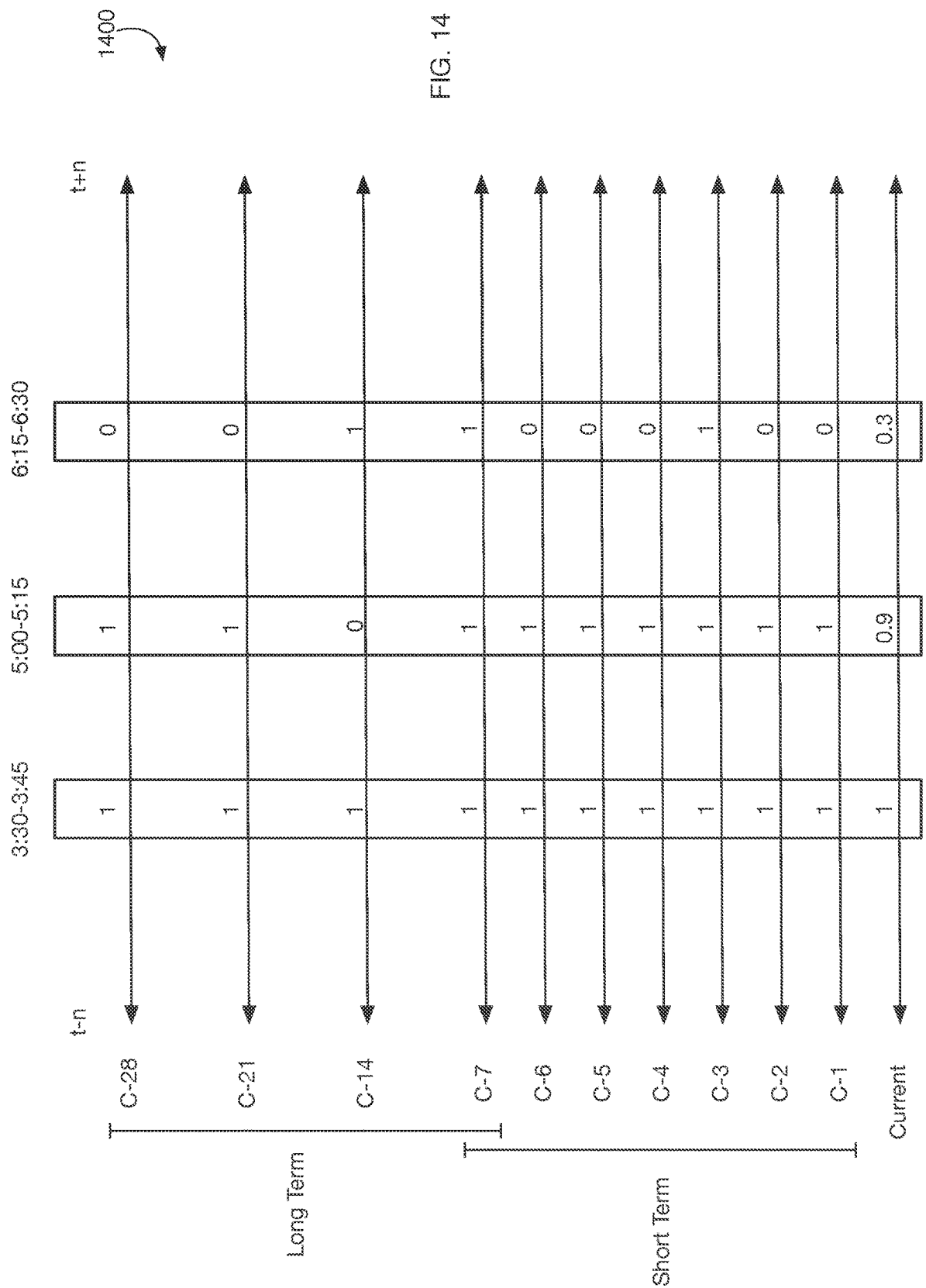

EFFICIENT CONTEXT MONITORING

INCORPORATION BY REFERENCE; DISCLAIMER

Each of the following applications are hereby incorporated by reference: application Ser. No. 16/727,233 filed on Dec. 26, 2019; application Ser. No. 15/151,338 filed on May 10, 2016; application No. 62/171,892 filed on Jun. 5, 2015. The Applicant hereby rescinds any disclaimer of claim scope in the parent application(s) or the prosecution history thereof and advises the USPTO that the claims in this application may be broader than any claim in the parent application(s).

TECHNICAL FIELD

This disclosure generally relates to efficiently monitoring the operating context of a computing device.

BACKGROUND

Software processes executing on a computing device use device state information to perform various functions on the computing device. An operating system process on the computing device can use battery charge state information to warn the user about a potential power failure. A location-based application can use location state information to determine when to present information for a nearby business. A music application can determine how to output sound based on state information that describes the type of speaker, headphones, or other sound-producing device connected to the computing device. To obtain this device state information, the software processes (e.g., operating system, application, utility, etc.) must be configured (e.g., programmed) to access various application programming interfaces (APIs) to access various different sources of device state information. To detect changes in device state, the software systems must be programmed to periodically obtain updated device state information and analyze the device state information for changes in device state. The programmers of these software systems are often burdened with learning many different APIs to obtain the device state information needed by the software systems. Additionally, the programmers must write the code to periodically check the state of the system components. Moreover, the various software systems waste processing time and resources by duplicating the code needed to periodically check and detect changes in device state.

SUMMARY

Disclosed are systems, methods, and non-transitory computer-readable storage media for monitoring the current context of a computing device. In some embodiments, a context daemon can collect context information about the computing device. The context information can include current device hardware state information. The context information can include current software state information. The context can be derived or implied from a combination of hardware state information, software state information, or any other type of state information. For example, the derived context can be a user state (e.g., a user activity, sleeping, running, etc.) derived from or implied by hardware or software state information.

In some embodiments, context information can be reported to the context daemon by context monitors. The context monitors can be specifically built for collecting context information monitored by the context daemon. The context monitors can be applications, utilities, tools, or the like that were built for other purposes, use or generate hardware or software state information, and report the state information to the context daemon. Once the context information has been collected, the context daemon can store the current context of the computing device in a central location so that context clients (e.g., software, applications, utilities, operating system, etc.) can obtain current context information from a single source. In some embodiments, the context daemon can generate and/or collect historical context information. The historical context information can include the old or outdated context information. The historical context information can be derived from the context information. Thus, the context daemon can provide a central repository of context information that context clients (e.g., processes) can use to determine the current context of the computing device.

Disclosed are systems, methods, and non-transitory computer-readable storage media for notifying context clients of changes to the current context of a computing device. In some embodiments, a context client can register to be called back when the context daemon detects specified context. For example, the context client can specify a context in which the context client is interested. When the context daemon detects that the current context of the computing device corresponds to the registered context, the context daemon can notify the context client that the current context matches the context in which the context client is interested. Thus, context clients do not require the programming necessary to independently obtain context updates and detect changes in context that are relevant or of interest to the context client.

Disclosed are systems, methods, and non-transitory computer-readable storage media for efficiently monitoring the operating context of a computing device. In some embodiments, the context daemon and/or the context client can be terminated to conserve system resources. For example, if the context daemon and/or the context client are idle, they can be shutdown to conserve battery power or free other system resources (e.g., memory). When an event occurs (e.g., a change in current context) that requires the context daemon and/or the context client to be running, the context daemon and/or the context client can be restarted to handle the event. Thus, system resources can be conserved while still providing relevant context information collection and callback notification features.

Disclosed are systems, methods, and non-transitory computer-readable storage media for predicting a future context of a computing device. In some embodiments, a context daemon can use historical context information to predict future events and/or context changes. For example, the context daemon can analyze historical context information to predict user sleep patterns, user exercise patterns, and/or other user activity. In some embodiments, a context client can register a callback for a predicted future context. For example, the context client can request to be notified ten minutes in advance of a predicted event and/or context change. The context daemon can use the prediction to notify a context client in advance of the predicted event.

BRIEF DESCRIPTION OF THE DRAWINGS

The above recited and other features of the disclosure will become apparent by reference to specific embodiments thereof that are illustrated in the appended drawings. Understanding that these drawings depict only example embodiments of the technology described herein and therefore do not limit its scope, the principles herein are described and explained with additional specificity and detail through the use of the accompanying drawings in which:

FIG. 2A illustrates an example of context items that can make up the current context;

FIG. 2B illustrates an example of a new context item being added to the current context;

FIG. 3 illustrates an example callback predicate database;

FIG. 6 illustrates an example historical event stream database;

FIG. 8A is a block diagram of an example system illustrating restarting a requesting client that has been terminated;

FIG. 8B is a block diagram of an example system illustrating restarting a requesting client that has been terminated;

FIG. 13A is a block diagram of an example system illustrating restarting a requesting client using a launch daemon;

FIG. 13B is a block diagram of an example system illustrating restarting a requesting client using a launch daemon;

FIG. 14 is a graph that illustrates an example of slot-wise averaging to predict future events;

DETAILED DESCRIPTION

Determining the Current Context

Figure 1:
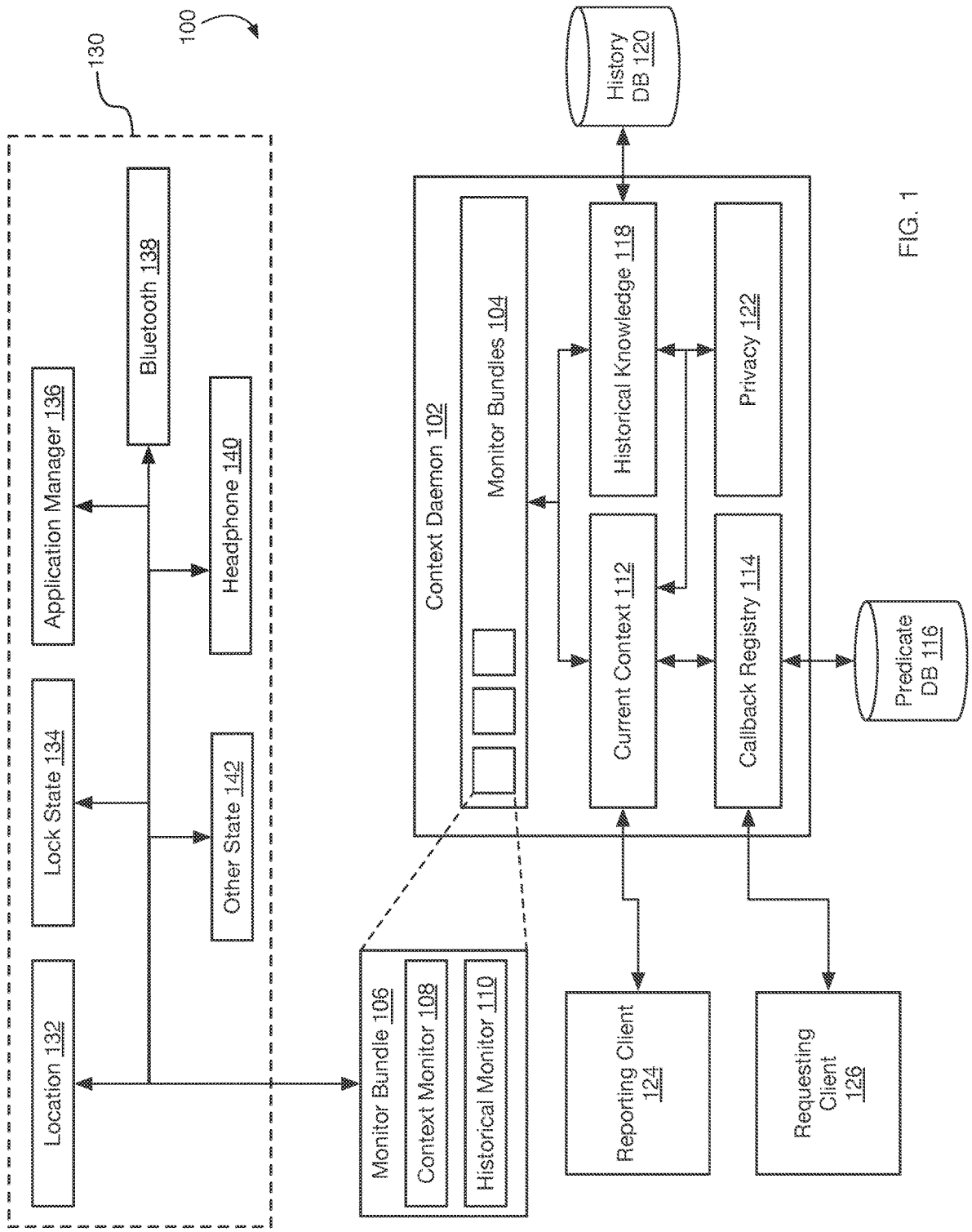
FIG. 1 is a block diagram of an example system for monitoring, predicting, and notifying context clients of changes in the current context of a computing device.

FIG. 1 is a block diagram of an example system 100 for monitoring, predicting, and notifying context clients of changes in the operational context of a computing device. The computing device can be, for example, a desktop computer, laptop computer, smartphone, tablet computer, or any other type of computing device. System 100 can be configured to run on the computing device, for example. In some embodiments, system 100 can include context daemon 102. For example, context daemon 102 can be a background process executing on the computing device. Context daemon 102 can be a process included in the operating system of the computing device, for example.

In some embodiments, context daemon 102 can be configured to collect information about the current operating context of the computing device. For example, the context information can include information that describes the internal and/or external context of the computing device. In some embodiments, internal context information can include hardware state information. For example, the hardware state information can identify hardware that is in use and how the hardware is being used. If the hardware is a wireless transceiver being used to communicate with another device, the hardware state information can identify the other device, when the connection was created, how much data has been transmitted, etc. In some embodiments, the internal context information can include software state information. For example, the state information for a calendar application can include calendar events, meetings, names of contacts who will participate in the meetings, start and finish times for the meetings, etc.

In some embodiments, the external context information can include a user activity. For example, the external context information can be derived from the hardware state information and/or the software state information. For example, context daemon 102 can derive user behavior (e.g., sleep patterns, work patterns, eating patterns, travel patterns, etc.) from the hardware and/or software state information, as described further below.

In some embodiments, context daemon 102 can include monitor bundles 104 for collecting various types of context information. Each monitor bundle 106 in monitor bundles 104 can be configured to collect context information about corresponding context items. For example, monitor bundle 106 can be a process external to context daemon 102.

Monitor bundle 106 can be a dynamically loaded software package that can be executed within context daemon 102.

In some embodiments, monitor bundle 106 can include context monitor 108. For example, context monitor 108 can be configured to collect information about the current context of the computing device. In some embodiments, monitor bundle 106 can include historical monitor 110. For example, historical monitor 110 can be configured to collect or determine the historical context for the computing device, as described further below.

In some embodiments, each monitor bundle 106 in monitor bundles 104 can be configured to collect specific types of context information. For example, context daemon 102 can load a plurality of different monitor bundles 106. Each monitor bundle 106 can be configured to collect different context information from different sources 130 within the computing device. For example, one monitor bundle 106 can collect context information about a Bluetooth context item while another monitor bundle 106 can collect context information about a lock state context item.

In some embodiments, monitor bundle 106 can be configured to collect device location context information from location API 132. For example, context monitor 108 can receive current global navigational satellite system (GNSS) location data received by a GNSS receiver from location API 132. Monitor bundle 106 can receive current cellular and/or WiFi derived location data from location API 132.

In some embodiments, monitor bundle 106 can be configured to collect lock state context information from lock state API 134. For example, context monitor 108 can collect lock state context information that describes the current lock state (e.g., locked, unlocked, etc.) of the computing device. For example, a user of the computing device must unlock the computing device to use or interact with the computing device. When the device is locked, the device can be configured to not accept user input. When the device is unlocked, the device can be configured to accept user input. For handheld devices with touchscreen displays, when the device is unlocked, the display can be illuminated and can accept touch input from the user. When the touchscreen device is locked, the display can be dark and the touchscreen display will not accept touch input. Thus, the lock state of the computing device can provide evidence that the user has interacted with the computing device.

In some embodiments, monitor bundle 106 can be configured to collect application context information from application manager API 136. For example, context monitor 108 can receive from application manager API 136 information describing which applications are currently running on the computing device, how long the applications have been running, when the applications were invoked, and/or which application is currently the application in focus (e.g., in the foreground, visible on the display).

In some embodiments, monitor bundle 106 can be configured to collect Bluetooth context information from Bluetooth API 138. For example, context monitor 108 can receive from Bluetooth API 138 information describing an active Bluetooth connection, including the identification and type of Bluetooth device connected to the computing device, when the connection was established, and the how long (e.g., duration) the computing device has been connected to the Bluetooth device.

In some embodiments, monitor bundle 106 can be configured to collect headphone jack information from headphone API 140. For example, context monitor 108 can receive from headphone API 140 information that describes whether a wired headphone or headset (or other device) is currently connected to the headphone jack of the computing device. In some embodiments, monitor bundle 106 can receive information about the type of device connected to the headphone jack from headphone API 140.

In some embodiments, monitor bundle 106 can be configured to collect other context information from other device state APIs 142. For example, context monitor 108 can receive from other state APIs 138 information that describes WiFi connections, telephone connections, application usage, calendar events, photographs, media usage information, battery charging state, and/or any other state information that can be used to describe or infer the current internal and/or external context of the computing device.

In some embodiments, monitor bundle 106 can be dynamically loaded into context daemon 102 as needed. For example, when location context information is needed (e.g., a client has requested location information) by context daemon 102, then context daemon 102 can load a location-specific monitor bundle 106 into monitor bundles 104. Once loaded, context monitor 108 of monitor bundle 106 can start collecting current location-specific context. By loading monitor bundles 106 as needed, context daemon 102 can conserve system resources of the computing device, such as memory and battery power. In some embodiments, monitor bundle 106 can be an external process, such as reporting client 124. Context daemon 102 can invoke the external process monitor bundle 106 as needed to collect context information. For example, context daemon 102 can load or invoke monitor bundle 106 in response to receiving a callback request, as described below.

In some embodiments, context daemon 102 can receive context information from reporting client 124. For example, reporting client 124 (context client) can be any software running on the computing device that generates or collects context information and reports the context information to context daemon 102. For example, a map application running on the computing device can obtain location information using location API 132 to determine how to route the user from a starting location to a destination location. In addition to determining the route, the map application can report the location information obtained from location API 132 to context daemon 102. Thus, while reporting client 124 is not built for the purpose of collecting and reporting context information like monitor bundle 106, reporting client 124 can be configured to report context information when reporting client 124 obtains the context information while performing its primary function.

In some embodiments, context daemon 102 can include current context 112. For example, current context 112 can be an in-memory repository of context information received from monitor bundles 104 (e.g., monitor bundle 106) and/or reporting client 124. When monitor bundles 104 and/or reporting client 124 report context information to context daemon 102, context daemon 102 can update current context 112 with the newly received context information. Thus, current context 112 can include context information (e.g., context items) describing the current context of the computing device.

FIG. 2A and FIG. 2B illustrate example current contexts 200 and 250. FIG. 2A illustrates an example of context items that can make up current context 200. For example, current context 200 (e.g., current context 112) can include context information for the computing device at time T0. For example, current context 200 can include a context item that represents the current locked state (false). Current context 200 can include a context item that represents the plugged in state of the headphone jack (false). Current context 200 can include a context item that represents the charging state of the battery (false). Current context 200 can include a context item that represents the connection state of the Bluetooth transceiver (false). Current context 200 can include a context item that identifies the application currently in focus on the computing device (social app). The context information shown in current context 200 can be received from monitor bundle 106 and/or from reporting client 124, for example.

FIG. 2B illustrates an example of a new context item being added to current context 250. Current context 250 (e.g., current context 112) can include context information for the computing device at some later time T1. For example, current context 250 includes a new context item that identifies the current location of the computing device. The new location context item can be added when a new location monitor bundle 106 is loaded into context daemon 102 and starts reporting location context information to context daemon 102. For example, the new location monitor bundle 106 can be loaded in response to a request from a context client for location information.

Callback Requests

Referring to FIG. 1, in some embodiments, context daemon 102 can expose an API that allows context client software running on the computing device to access (e.g., query, view, etc.) the information in current context 112. In some embodiments, context daemon 102 can receive a request from requesting client 126 (e.g., context client) to callback registry 114 when a specific context is detected by context daemon 102. For example, requesting client 126 can send a callback request to context daemon 102. Context daemon 102 can store the callback request information in callback registry 114. Callback registry 114 can be an in-memory repository of callback information. For example, the callback request can specify a predicate (e.g., a context condition) for notifying requesting client 126. The callback request can include a client identifier for requesting client 126.

In some embodiments, when the callback request is received, callback registry 114 can generate a unique identifier for the callback request and store the callback request identifier, the client identifier, and callback predicate in callback predicate database 116. Context daemon 102 can return the callback request identifier to requesting client 126 in response to receiving the callback request. When the context information in current context 112 satisfies the predicate, context daemon 102 will notify requesting client 126. For example, the callback notification can include the callback request identifier so that requesting client 126 can determine the callback request corresponding to the notification. For example, requesting client 126 can register many callback requests with context daemon 102. When callback daemon 102 sends a callback notification to requesting client 126, requesting client 126 can use the callback request identifier to determine to which callback request the callback notification relates.

In some embodiments, context daemon 102 can load monitor bundle 106 in response to receiving a callback request from requesting client 126. For example, context daemon 102 can support lazy initialization of monitor bundles 106. In other words, context daemon 102 can load and initialize monitor bundle 106 when needed to service a callback request. For example, if no client is interested in location information, then context daemon 102 can be configured to not load a location monitor bundle 106 so that system resources (e.g., battery, memory, etc.) are not wasted monitoring a context item that is not needed. However, upon receipt of a callback request for the location context item, content daemon 102 can load, initialize, or invoke the monitor bundle 106 associated with the location context item and start receiving context information regarding the location of the computing device.

In some embodiments, monitor bundle 106 can be a software plugin for context daemon 102. For example, monitor bundle 106 can be software code (e.g., library, object code, java jar file, etc.) that can be dynamically loaded into context daemon 102 and executed to monitor context information. In some embodiments, monitor bundle 106 can be a separate process external to context daemon 102. For example, monitor bundle 106 can be a standalone executable that context daemon 102 can invoke to monitor and report context information.

FIG. 3 illustrates an example callback predicate database 300. For example, predicate database 300 can correspond to predicate database 116 of FIG. 1. In some embodiments, each entry 302-316 in predicate database 300 can include a callback request identifier. For example, when context daemon 102 receives a callback request from requesting client 126, context daemon 102 can generate a unique request identifier for the callback request. As described above, context daemon 102 can return the callback request identifier to requesting client 126 in response to the callback request. Context daemon 102 can associate the generated callback request identifier ("Request ID") with the client identifier ("Client ID"), the callback predicate ("Predicate"), and the condition for callback ("Callback Condition") in the callback predicate database, as shown in FIG. 3. When the context daemon 102 sends a callback notification to requesting client 126, context daemon 102 can include the callback identifier in the notification so that requesting client 126 can determine why context daemon 102 is sending the callback notification. For example, requesting client 126 can send multiple callback requests to context daemon 102. Requesting client 126 can determine for which callback request context daemon 102 is sending a notification based on the callback request identifier.

In some embodiments, each entry 302-316 in predicate database 300 can include a client identifier and a callback predicate. The client identifier can correspond to the client that requested to be notified (e.g., called back) when the current context of the computing device satisfies the corresponding predicate specified by requesting client 126. In some embodiments, the client identifier can be generated by a launch daemon configured to launch (e.g., execute, invoke, etc.) processes on the computing device, as describe further below. For example, entry 302 corresponds to a requesting client 126 having client identifier "Client_ID1" that requested to be notified when the current context of the computing device indicates that the device is locked and that the application in focus is the music application. Stated differently, the context client (e.g., requesting client 126) corresponding to client identifier "Client_ID1" specified that the predicate for notifying (e.g., calling back) the context client is that the device is locked and the application currently being used by the user is the music application. For example, the predicate specified by requesting client 126 can identify one or more context conditions (e.g., hardware state values, software state values, derived context, etc.) separated by logical (e.g., Boolean) operators. When the current state of the computing device corresponds to the specified predicate, context daemon 102 will notify (e.g., call back) requesting client 126.

In some embodiments, a predicate can be associated with a callback condition (e.g., time component). For example, the callback condition can include "before" and/or "after" operators (e.g., terms) that allow a requesting client 126 to indicate an amount of time before or after some event (e.g., state change, context change, etc.) when the requesting client 126 should be notified. For example, context daemon 102 can receive calendar application state information that indicates that a meeting is scheduled at a specific time in the future. Requesting client 126 can register a predicate and callback condition (e.g., entry 316) that specifies that context daemon 102 should notify requesting client 126 thirty minutes before the meeting. When the current time corresponds to thirty minutes before the meeting, context daemon 102 can send a notification to requesting client 126. Similarly, context daemon 102 can predict a future event (e.g., user sleep period, user arriving at home, user arriving at the office, user waking up, etc.) based on historical context information. For example, requesting client 126 can register a predicate and callback condition (e.g., entry 306) that specifies that context daemon 102 should notify requesting client 126 thirty minutes before a predicted user sleep period. When the current time corresponds to thirty minutes before the predicted sleep period, context daemon 102 can send a notification to requesting client 126. Likewise, requesting client 126 can register a predicate and callback condition (e.g., entry 310) that specifies that context daemon 102 should notify requesting client 126 five minutes after the user is predicted to wake up based on the predicted sleep period. For example, when the current time corresponds to five minutes after the user wakes up, context daemon 102 can send a notification to requesting client 126. In some embodiments, a callback condition in not provided or provided as immediately upon satisfaction of the predicate. For example, requesting client 126 can register a predicate (e.g., entry 304) that specifies that context daemon 102 should notify requesting client 126 immediately based on the predicate unlocked and at home. When requesting client 126 is unlocked and at the location home, context daemon 102 can send a notification to requesting client 126.

Event Streams

Referring to FIG. 1, in some embodiments, context daemon 102 can include historical knowledge repository 118. For example, while current context 112 includes context information that reflects the current state of the computing device, as described above, historical knowledge 118 includes historical context information. Historical knowledge 118 can be an in-memory repository of historical context information. For example, historical knowledge 118 can include event streams that represent changes in context (e.g., state) over time. For example, each event or context item tracked in current context 112 has a corresponding value. When a context item in current context 112 changes value, the previous value can be recorded in historical knowledge 118. By analyzing the state changes, a start time, and an end time, a duration can be calculated for each context item value.

Figure 4:
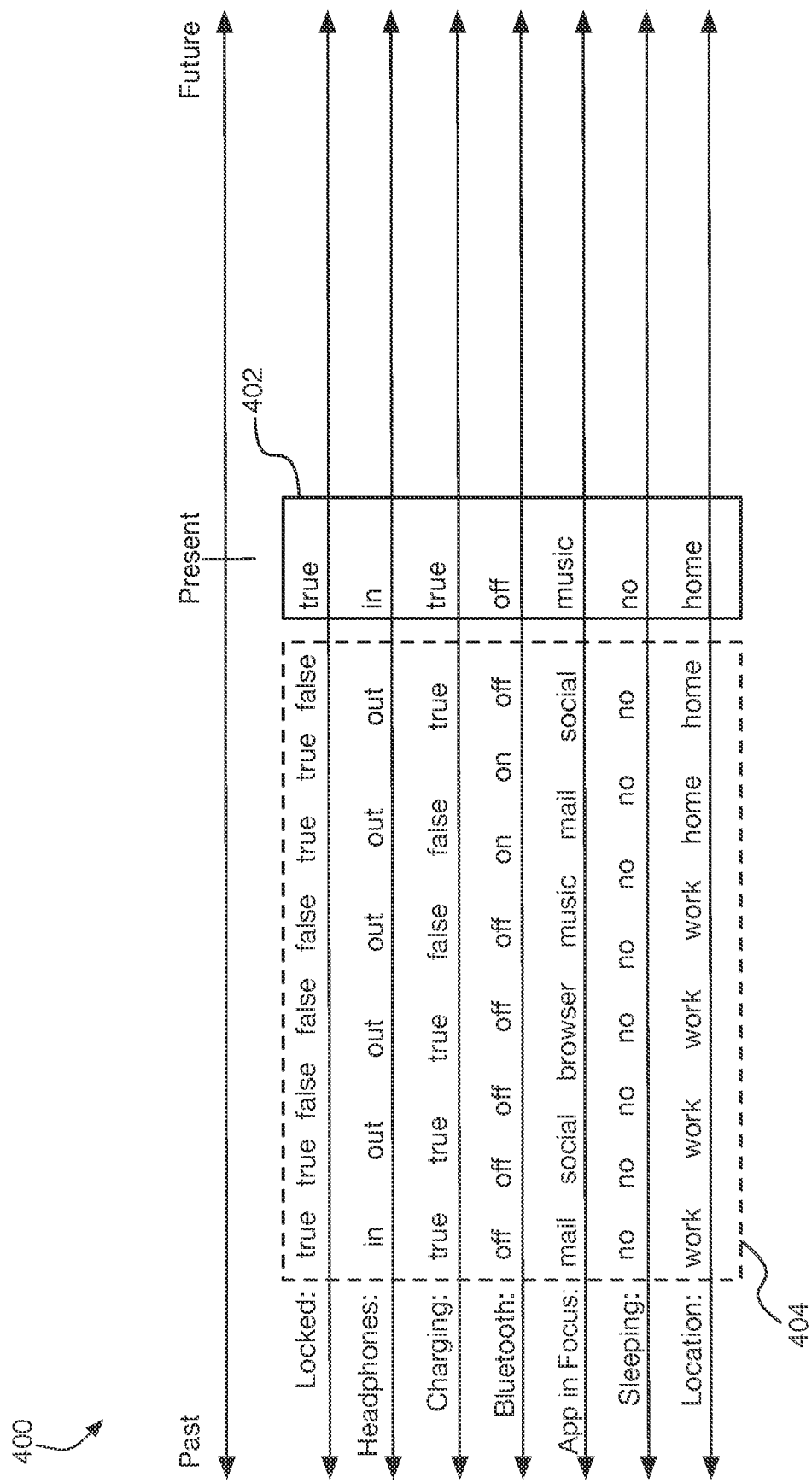
FIG. 4 is a graph that illustrates example state changes associated with context items over time.

FIG. 4 is a graph 400 that illustrates example value changes associated with context items over time. For example, graph 400 includes current context 402 that indicates the current values for context items (e.g., locked, headphones, charging, Bluetooth, app in focus, sleeping, and location). Graph 400 includes past (e.g., historical) values 404 for the same context items over time. By analyzing changes in context item values, context daemon 102 can determine start times, end times, and durations for each value associated with the context items, as illustrated by FIG. 5 below.

Figure 5:
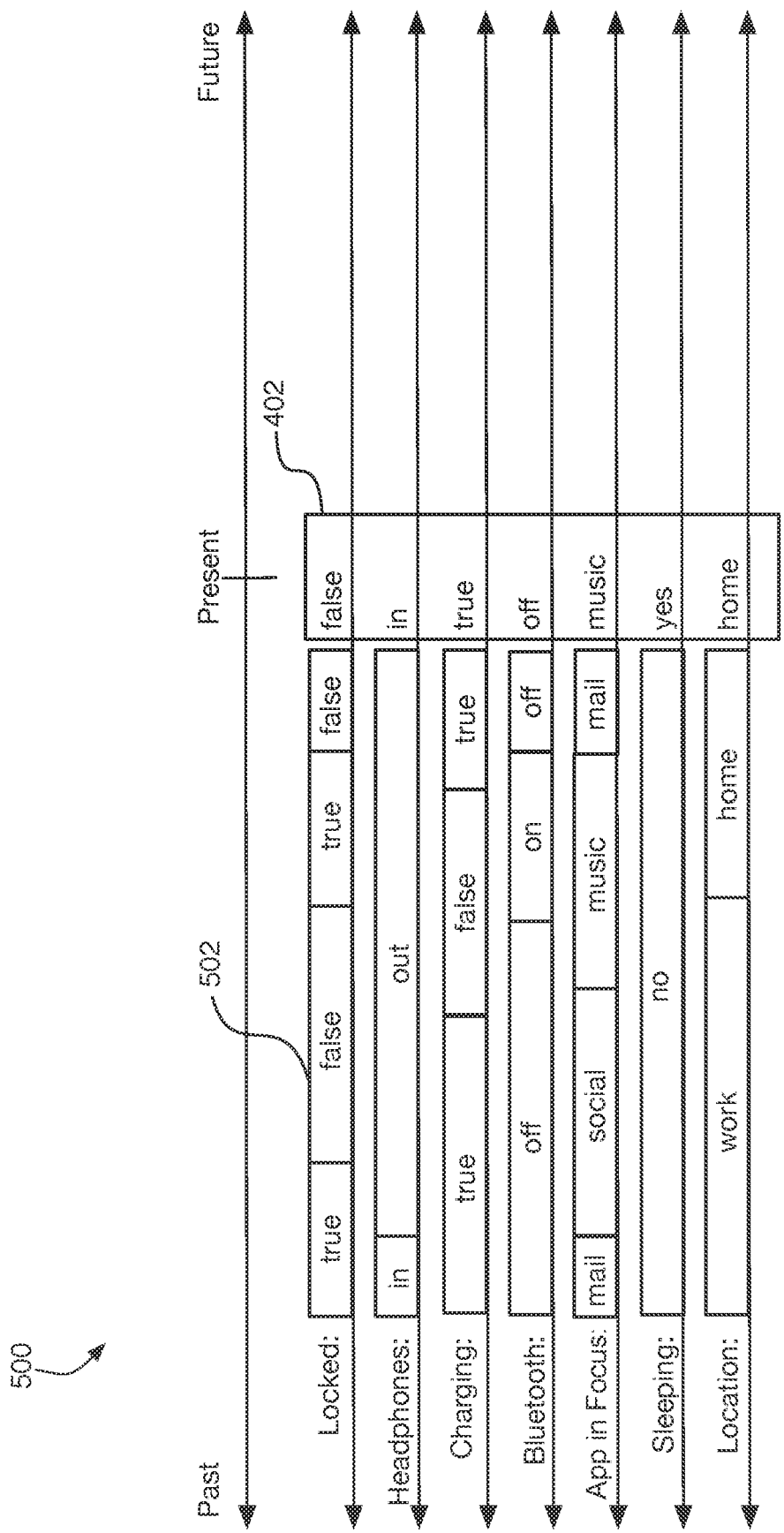
FIG. 5 is a graph that illustrates example event streams associated with context items.

FIG. 5 is a graph 500 that illustrates example event streams associated with context items. In some embodiments, each state change represented in graph 400 of FIG. 4 can be converted into a data object (e.g., object 502) that includes data describing the duration that a particular state existed within the system and metadata associated with the state. In some embodiments, historical monitor 110 can be configured to convert current and/or historical context information into historical event stream objects. For example, when a value change is detected for a context item corresponding to a particular monitor bundle 106, historical monitor 110 can generate historical event stream objects based on the prior value of the context item. For example, some context monitors 106 can be configured to periodically report the state of a software and/or hardware component of the computing device. Context monitor 106 can be configured to periodically report Bluetooth state information, for example. The reported Bluetooth state information can include a sequence of identical state values followed by a state change. For example, context monitor 106 can report that the state of Bluetooth is "off, on, off, off, on." Historical monitor 110 can combine the series of "off" Bluetooth context item values, determine the start time and the end time of the "off" value, and calculate a duration the Bluetooth component was in the "off" state.

In some embodiments, historical monitor 110 can collect additional information (e.g., metadata) for event stream objects. For example, continuing the Bluetooth example above, historical monitor 110 can determine that the Bluetooth context item had an "on" value and request additional information from Bluetooth API 138. For example, historical monitor 110 can receive from Bluetooth API 138 information identifying the type of Bluetooth device connected to the computing device, the Bluetooth protocol used, the amount of data transmitted over the Bluetooth connection, and/or any other information relevant to the Bluetooth connection.

In another example, while context monitor 108 can be configured to collect current context information (e.g., call information) from a telephony API (e.g., telephone number called, time when call was initiated, time when call was terminated, etc.), historical monitor 110 can collect event stream metadata for a call from a contacts API (e.g., name of person called, etc.) or a call history API (e.g., name of person called, duration of call, etc.) and add this additional information to the event stream object for a telephony context item. Thus, historical monitor 110 can be configured to generate or collect additional data about a historical event to make the historical event (e.g., event stream, event stream object) more valuable for historical reference and for predicting future events. Once historical monitor 110 collects or generates the event stream metadata, historical monitor 110 can store the event stream metadata in historical knowledge repository 118. In some embodiments, context daemon 102 and or historical monitor 110 can store event stream objects (e.g., including start time, stop time, duration, and/or metadata) in history database 120.

FIG. 6 illustrates an example historical event stream database 600. For example, historical event stream database can correspond to history database 120. The example historical event stream database 600 represents a conceptual depiction of the historical event stream data stored in history database 600 and may not reflect the actual embodiment of history database 600. A skilled person will recognize that the historical event stream data in database 600 can be organized and stored in many different ways.

In some embodiments, history database 600 can include event stream tables 602-614. For example, each event stream table 602-614 can correspond to a single event stream (e.g., context item). Each event stream table (e.g., tables 602-614, etc.) can include records (e.g., 616-626, etc.) corresponding to an event stream object in the event stream. For example, the "locked" event stream table 602 can include event stream object records 616, 618 that describe the locked (or unlocked) state of the "locked" event stream. The event stream object records can include a "start" field that has a timestamp (TS) value that indicates when the event began. The event stream object records can include a "duration" field that indicates the duration (D) of the event. The event stream object records can include state information (e.g., "locked:false" indicating that the device was not locked) that describes the state change corresponding to the event.

In some embodiments, the event stream object records can include metadata that describes other data associated with the event. For example, when generating the historical event stream data, historical monitor 110 can collect and/or generate metadata that describes additional attributes of or circumstances surrounding the state of the system at the time of the event. For example, for the "charging" event stream 606, historical monitor 110 can collect information related to the state of battery charge (e.g., percent charge, charge level, etc.) at the beginning and/or ending of the charging event. For the Bluetooth event stream 608, historical monitor 110 can collect information related to the type of Bluetooth device connected to the computing device and/or the source of the media transmitted to the Bluetooth device. For the location event stream 612, historical monitor 110 can convert raw location data (e.g., grid coordinates, GNSS data, cell tower identification data, Wi-Fi network identifiers, etc.) into location terms that a human user can understand (e.g., home, work, school, grocery store, restaurant name, etc.).

In some embodiments, historical monitor 110 can generate or obtain more accurate location information than context monitor 108. For example, context monitor 108 can provide current (e.g., instantaneous) location information without much, if any, processing. This initial location data can be inaccurate due to a variety of issues with location technologies (e.g., signal multipath issues, difficulty connecting to enough satellites, etc.). Given additional time and additional data, the location can be determined with greater accuracy. Since, historical monitor 110 processes historical data (rather than current or instantaneous data), historical monitor 110 can take the time to obtain more accurate location information from location API 132, for example. This additional metadata describing an event can be stored in the event stream records of history database 600.

In some embodiments, historical monitor 110 can obtain historical information about a context item upon initialization of monitor bundle 106. For example, if monitor bundle 106 is configured to monitor location context, then context daemon 102 can load, invoke, and/or initialize monitor bundle 106 as needed, as described above. When monitor bundle 106 is initialized, context monitor 108 can collect context information for the location context item. However, when monitor bundle 106 is initialized, there is no historical data for the location context item because the location context item was not previously monitored. Thus, in some embodiments, historical monitor 110 can request location history data from location API 132 and generate historical context information (e.g., event streams, event stream objects, etc.) based on the location history data received from location API 132.

Event Stream Privacy

In some embodiments, each event stream can have a corresponding privacy policy 122. In some embodiments, the event streams can be configured with default privacy policies. In some embodiments, an administrative user can provide input to the computing device to configure the privacy policies for each event stream (e.g., for each context item). For example, the privacy policy corresponding to respective event streams can change over time.

In some embodiments, the event stream for a context item can have a privacy policy that prevents maintaining historical information for the context item. For example, an event stream corresponding to the location context item can have a policy that disables maintaining a historical record of the location of the computing device. When this "no history" policy is configured for an event stream, historical monitor 110 will not generate historical context information (e.g., event stream objects) for the event stream.

In some embodiments, the event stream for a context item can have a privacy policy that specifies an amount of time (e.g., time-to-live) that historical context information should be stored before being deleted. For example, an event stream corresponding to the "app in focus" context item can have a time-to-live policy specifying that event stream data for the "app in focus" context item that is older than a specified amount of time (e.g., 3 days, 1 month, etc.) should be deleted. Context daemon 102 can periodically perform maintenance on the event stream to delete event stream objects that are older than the amount of time specified in the time-to-live policy.

In some embodiments, the event stream for a context item can have a timestamp de-resolution policy. For example, when the timestamp de-resolution policy is in effect, historical monitor 110 can make the precise timestamps associated with events (e.g., state changes) in the event stream less precise. For example, a location change event can have a timestamp that is accurate down to the millisecond. When the de-resolution policy is applied to the event stream, historical monitor 110 can use a less accurate timestamp that is accurate down to the second or minute. For example, by using a less accurate timestamp for a location event stream, the system can protect a user's privacy by preventing context clients from determining the precise timing of a user's locations (e.g., movements).

In some embodiments, the event stream for a context item can have a storage location policy. For example, the computing device can be configured with different storage locations corresponding to the security state of the computing device. For example, the computing device can have an "A" class database that can only be accessed when the computing device is unlocked (e.g., the user has entered a passcode to unlock the device). The computing device can have a "C" class database that can be accessed after the first unlock (e.g., without requiring a subsequent unlock) after a reboot or startup of the computing device. The computing device can have a "D" class database that can be accessed anytime (e.g., regardless of passcode entry). The storage location privacy policy for the event stream can identify in which class of database to store the corresponding event stream data.

Efficient Context Monitoring

In some embodiments, the computing device can be configured to terminate software running on the computing device when the software is not being used. For example, the operating system of the computing device can be configured to identify processes that are idle. The operating system can shutdown (e.g., terminate, kill) idle processes to free up memory or conserve battery resources for use by other components (e.g., software, hardware) of the system. However, if the operating system terminates an idle context daemon 102, context daemon 102 will no longer be able to monitor the current context of the system and will not be able to notify requesting clients 126 of context changes. Similarly, if the operating system terminates an idle requesting client 126, requesting client 126 will not be running to receive the callback notification from context daemon 102. The following paragraphs describe various mechanisms by which context daemon 102 and/or requesting client 126 can be restarted to handle context monitoring and/or callback operations.

Figure 7:
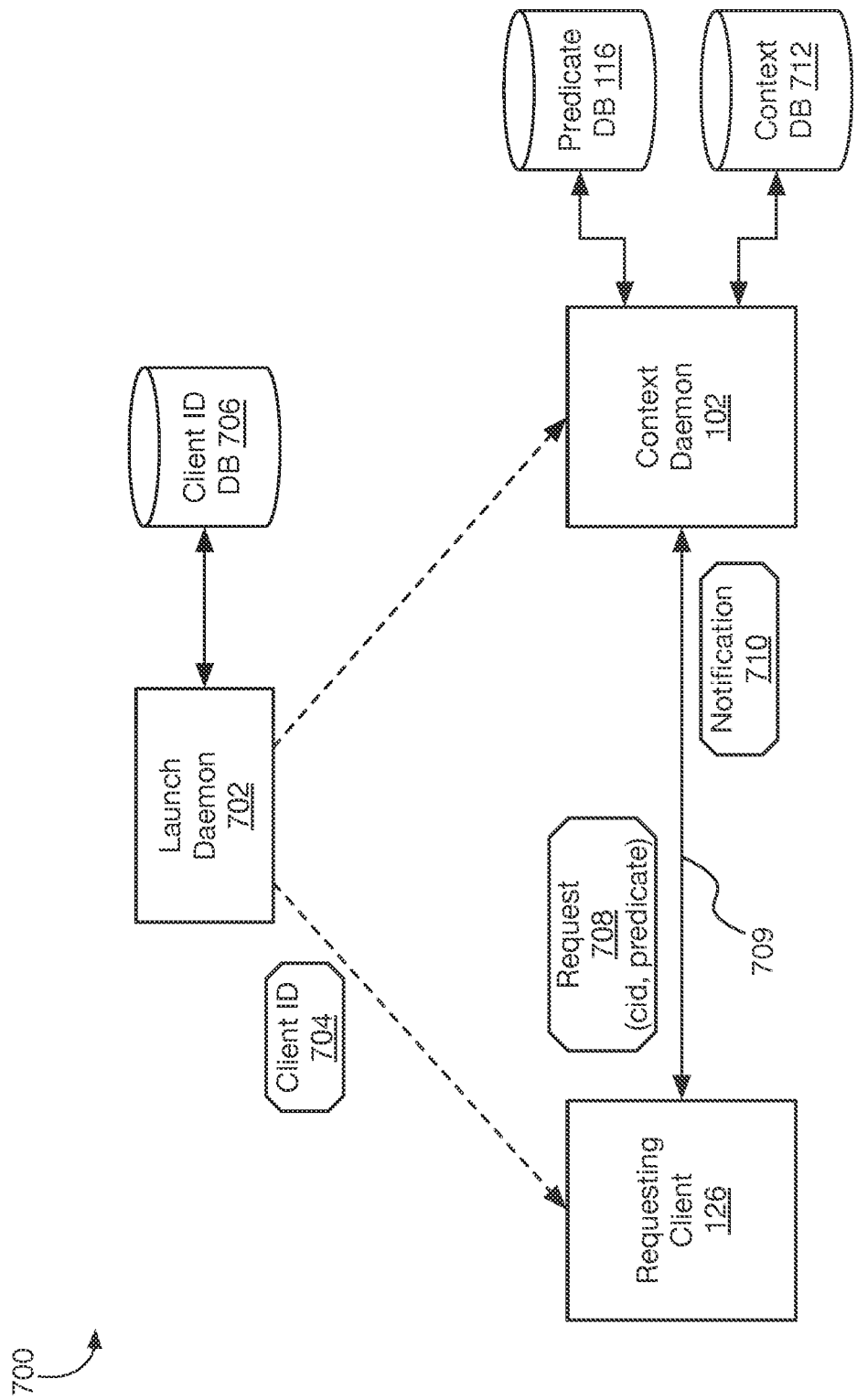
FIG. 7 is a block diagram of an example system for providing a context callback notification to a requesting client.

FIG. 7 is a block diagram of an example system 700 for providing a context callback notification to a requesting client 126. For example, system 700 can correspond to system 100 of FIG. 1 above. In some embodiments, system 700 can include launch daemon 702. For example, launch daemon 702 can be configured to launch (e.g., invoke, start, execute, initialize, etc.) applications, utilities, tools, and/or other processes on the computing device. Launch daemon 702 can be configured to monitor processes and terminate idle processes on the computing device.

In some embodiments, launch daemon 702 can launch requesting client 126. For example, a process (e.g., operating system, user application, etc.) running on the computing device can invoke requesting client 126. Launch daemon 702 can receive a message corresponding to the invocation and can launch requesting client 126. Upon launching requesting client 126, launch daemon 702 can provide requesting client 126 a client identifier 704 that can be used to identify requesting client 126 within the computing device.

In some embodiments, client identifier 704 can be token (e.g., encrypted data) generated by launch daemon 702 and assigned to requesting client 126 by launch daemon 702. Launch daemon 702 can store a mapping between the token and the software package corresponding to (e.g., defining) requesting client 126 in client identifier database 706. The token can be generated such that the token itself does not identify the corresponding requesting client 126. However, when launch daemon 702 later receives the token, launch daemon 702 can use the token to look up the corresponding requesting client 126 in client identifier database 706. Thus, the token can be used by launch daemon 702 as an index to identify the corresponding requesting client while the token is opaque to other software within the computing device.

In some embodiments, client identifier 704 can be an instance identifier corresponding to a specific instance of requesting client 126. In some embodiments, client identifier 704 can identify a software package (e.g., application, utility, tool, etc.) across all instances of requesting client 126. For example, when launch daemon 702 launches a first instance of requesting client 126, client identifier 704 can identify the first instance of requesting client 126. When requesting client 126 is terminated (e.g., because requesting client 126 has become idle), the same client identifier 704 can be used to identify subsequent instances of requesting client 126 that are launched by launch daemon 702. Launch daemon 702 can launch context daemon 102 using similar mechanisms as requesting client 126.

In some embodiments, requesting client 126 can send callback request 708 to context daemon 102. For example, callback request 708 can include client identifier 704 and a callback predicate, as described above. Upon receipt of callback request 708, context daemon 102 can store client identifier 704 and the predicate in predicate database 116, as described above.

In some embodiments, when requesting client 126 sends the callback request 708 to context daemon 102, requesting client 126 establishes a communication session 709 with context daemon 102. In some embodiments, system 700 can be configured such that the communication session between requesting client 126 and context daemon 102 can only be initiated by requesting client 126. For example, context daemon 102 can be configured to not be able to directly establish a communication session with requesting client 126. Thus, in some embodiments, context daemon 102 can only communicate with (e.g., send a callback notification to) requesting client 126 while communication session 709 established by requesting client 126 is still open.

In some embodiments, context daemon 102 can collect contextual information about events occurring on the computing device. For example, context daemon 102 can collect context information from monitor bundles 106 and reporting client 124, as described above. In some embodiments, context daemon 102 can store the current context in context database 712. For example, context daemon 102 can store the current context in context database 712 to facilitate restoration of context information to context daemon 102. When context daemon 102 is terminated and restarted, context daemon 102 can restore the current context (e.g., previously stored context) from context database 712 while context daemon 102 is waiting for a context update from monitor bundles 106.

In some embodiments, context daemon 102 can determine whether the current context corresponds to a predicate received from requesting client 126. For example, when new context data is obtained that updates the current context (e.g., changes the state of a context item), context daemon 102 can compare the callback predicates stored by context daemon 102 in callback registry 114 or predicate database 116 with the context items in current context 112 to determine whether the current context matches (corresponds to) the conditions specified by the predicates. When the current context matches a predicate registered by requesting client 126, context daemon 102 can send notification 710 to requesting client 126. For example, notification 710 can identify the callback request previously sent by requesting client 126 to context daemon 102, as described above. Thus, context daemon 102 can notify (e.g., call back) requesting client 126 when context daemon 102 detects a current context in which requesting client 126 is interested.

FIG. 8A and FIG. 8B are block diagrams of example system 700 illustrating restarting a requesting client that has been terminated. For example, in FIG. 8A, system 700 has determined that requesting client 126 is idle and has terminated requesting client 126 (e.g., dashed outline of requesting client 126 indicating termination). In FIG. 8A, context daemon 102 is still running. However, because requesting client 126 has been terminated, communication session 709 has also been terminated.

FIG. 8B is a block diagram illustrating an example mechanism for restarting requesting client 126 using system 700. Continuing the example of FIG. 8A, context daemon 102 can receive context information that matches a callback predicate registered by requesting client 126. In response to determining that the context information matches the callback predicate, context daemon 102 can attempt to notify requesting client 126. While attempting to notify requesting client 126, context daemon 102 can determine that communication session 709 between context daemon 102 and requesting client 126 has been terminated. In response to determining that communication session 709 is terminated, context daemon 102 can request that launch daemon 702 restart requesting client 126. For example, context daemon 102 can send client identifier 704 received from requesting client 126 to launch daemon 702 in a request to restart requesting client 126.

In some embodiments, upon receipt of client identifier 704, launch daemon 702 can launch requesting client 126. For example, launch daemon 702 can determine that context daemon 102 is authorized to request that requesting client 126 be restarted based on the client identifier provided by context daemon 102. For example, context daemon 102 would not have client identifier 704 (e.g., token) if requesting client 126 did not previously request a callback from context daemon 102 and provide client identifier 704 to context daemon 102.

In some embodiments, upon restarting, requesting client 126 can send callback request 708 to context daemon 102. For example, requesting client 126 can establish a new communication session 802 between requesting client 126 and context daemon 102 by sending callback request 708 to context daemon 102. Once communication session 802 is established, context daemon 102 can send notification 710 to requesting client 126 to notify requesting client 126 that the callback predicate provided by requesting client 126 has been satisfied by the current context.

Figure 9A:
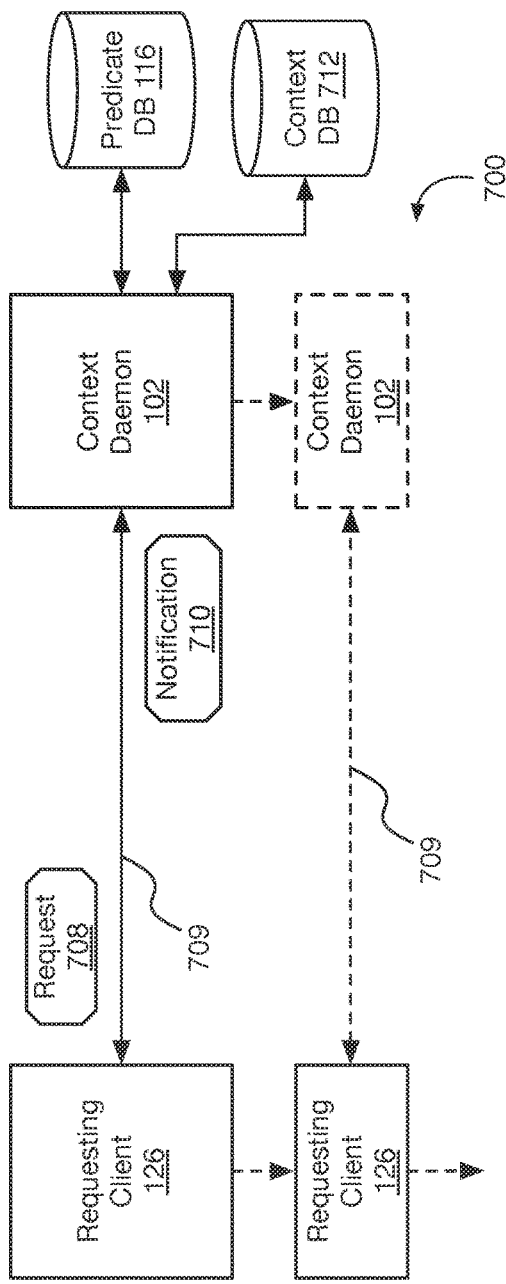
FIG. 9A is a block diagram of an example system illustrating restarting a context daemon that has been terminated.
Figure 9B:
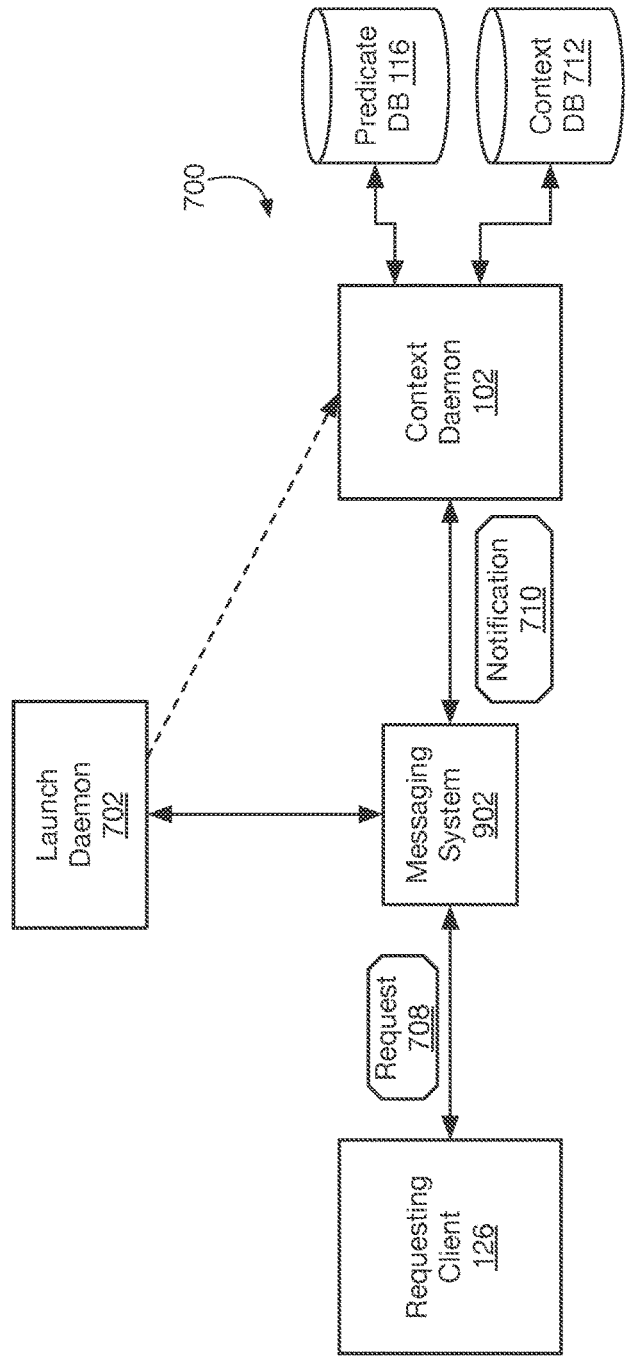
FIG. 9B is a block diagram of an example system illustrating restarting a context daemon that has been terminated.

FIG. 9A and FIG. 9B are block diagrams of example system 700 illustrating restarting a context daemon that has been terminated. For example, in FIG. 9A, system 700 has determined that context daemon 102 is idle and has terminated context daemon 102 (e.g., dashed outline of context daemon 102 indicating termination). In FIG. 9A, requesting client 126 is still running. However, because context daemon 102 has been terminated, communication session 709 has also been terminated.

FIG. 9B is a block diagram illustrating an example mechanism for restarting context daemon 102 using system 700. Continuing the example of FIG. 9A, system 700 can restart context daemon 102 in response to receiving a message from requesting client 126 that is directed to context daemon 102.

In some embodiments, requesting client 126 can detect that communication session 709 between requesting client 126 and context daemon 102 has terminated. In response to detecting that communication session 709 has terminated, requesting client 126 can reestablish the communication session by sending a message to the terminated context daemon 102. In some embodiments, requesting client can send the message to context daemon 102 using messaging system 902. Messaging system 902 of system 700 can determine that context daemon 102 is not running and send a message to launch daemon 702 to cause launch daemon 702 to restart context daemon 102. In response to receiving the message, launch daemon 702 can restart context daemon 102. Once context daemon 102 is running, messaging system 902 can send the message from requesting client 126 to context daemon 102, thereby reestablishing the communication channel between requesting client 126 and context daemon 102.

In some embodiments, upon restarting, context daemon 102 can restore its callback registry 114 and current context 112. For example, callback registry 114 can be restored from predicate database 116. Current context 112 can be restored from context database 712. Upon restarting, context daemon 102 can load the monitor bundles 106 necessary for collecting context information to service the callback requests restored from predicate database 116. Context daemon 102 can update current context 112 with the context information reported by loaded monitor bundles 104 and notify requesting client 126 when the context items in current context 112 match a predicate registered by requesting client 126, as described above.

Figure 10A:
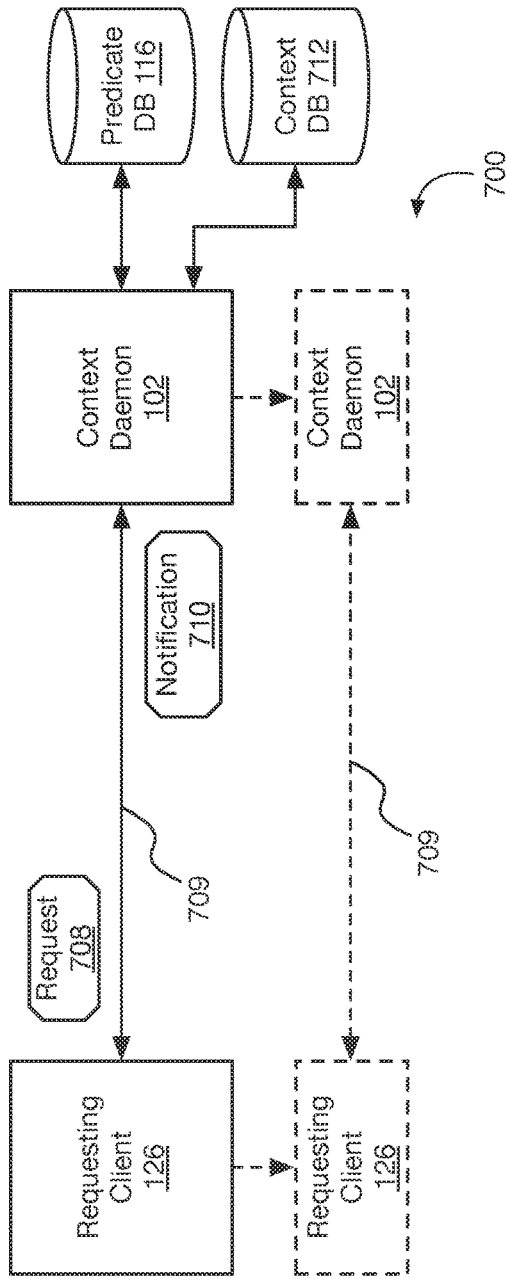
FIG. 10A is a block diagram of an example system illustrating restarting a context daemon and a requesting client that have been terminated.
Figure 10B:
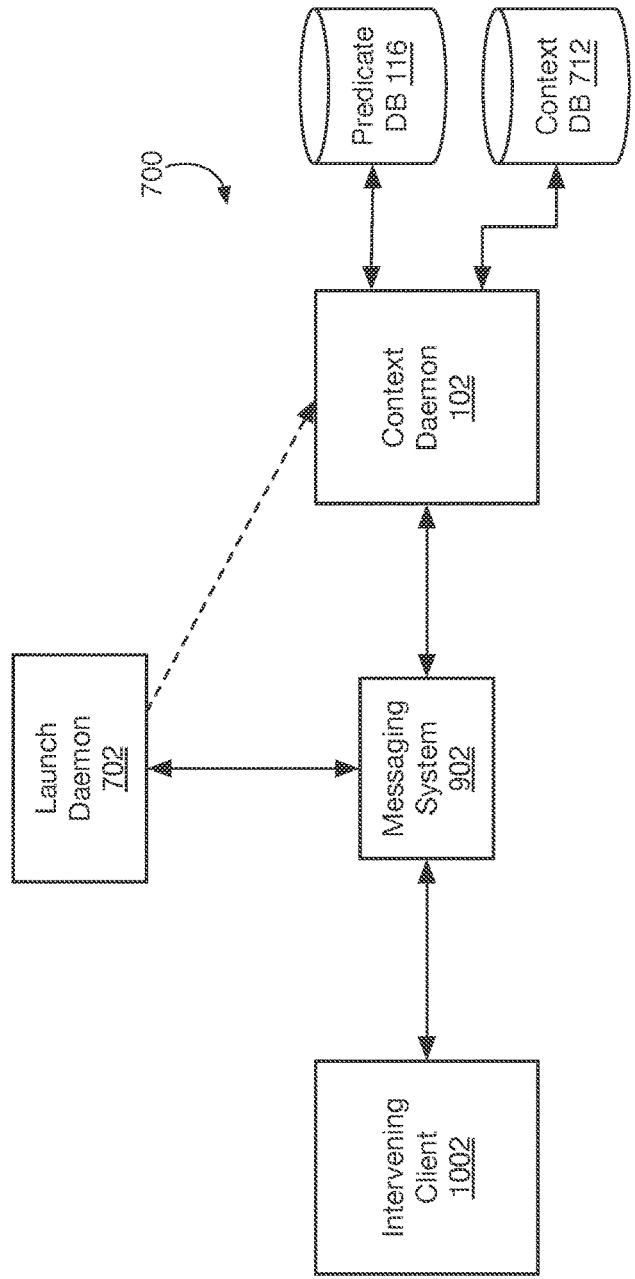
FIG. 10B is a block diagram of an example system illustrating restarting a context daemon and a requesting client that have been terminated.

FIG. 10A and FIG. 10B are block diagrams of example system 700 illustrating restarting a context daemon and a requesting client that have been terminated. For example, in FIG. 10A, system 700 has determined that both context daemon 102 and requesting client 126 are idle and has terminated context daemon 102 and requesting client 126 (e.g., dashed outline indicating termination). In FIG. 10A, because both context daemon 102 and requesting client 126 are terminated, communication session 709 is terminated.

FIG. 10B is a block diagram illustrating an example mechanism for restarting context daemon 102 and requesting client 126 using system 700. Continuing the example of FIG. 10A, system 700 can restart context daemon 102 in response to receiving a message from intervening client 1002 that is directed to terminated context daemon 102. For example, similar to requesting client 126 in FIG. 9B, intervening client 1002 can send a message to the now terminated context daemon 102. Messaging system 902 can receive the message and determine that context daemon 102 is not running. In response to determining that context daemon 102 is not running, messaging system 902 can send a message to launch daemon 702 to cause launch daemon 702 to restart context daemon 102.

In some embodiments, upon restarting, context daemon 102 can restore its callback registry 114 from predicate database 116. Upon restarting, context daemon 102 can restore its current context 112 from context database 712 and can start collecting updated context information, as described above. When context daemon 102 determines that a registered predicate matches the current context information, context daemon 102 can attempt to notify requesting client 126. When context daemon 102 determines that a communication session 709 does not exist between requesting client 126 and context daemon 102, context daemon 102 can request that launch daemon 702 restart requesting client 126 so that the communication session can be reestablished and context daemon 102 can callback requesting client 126, as described above with reference to FIG. 8B.

Figure 11:
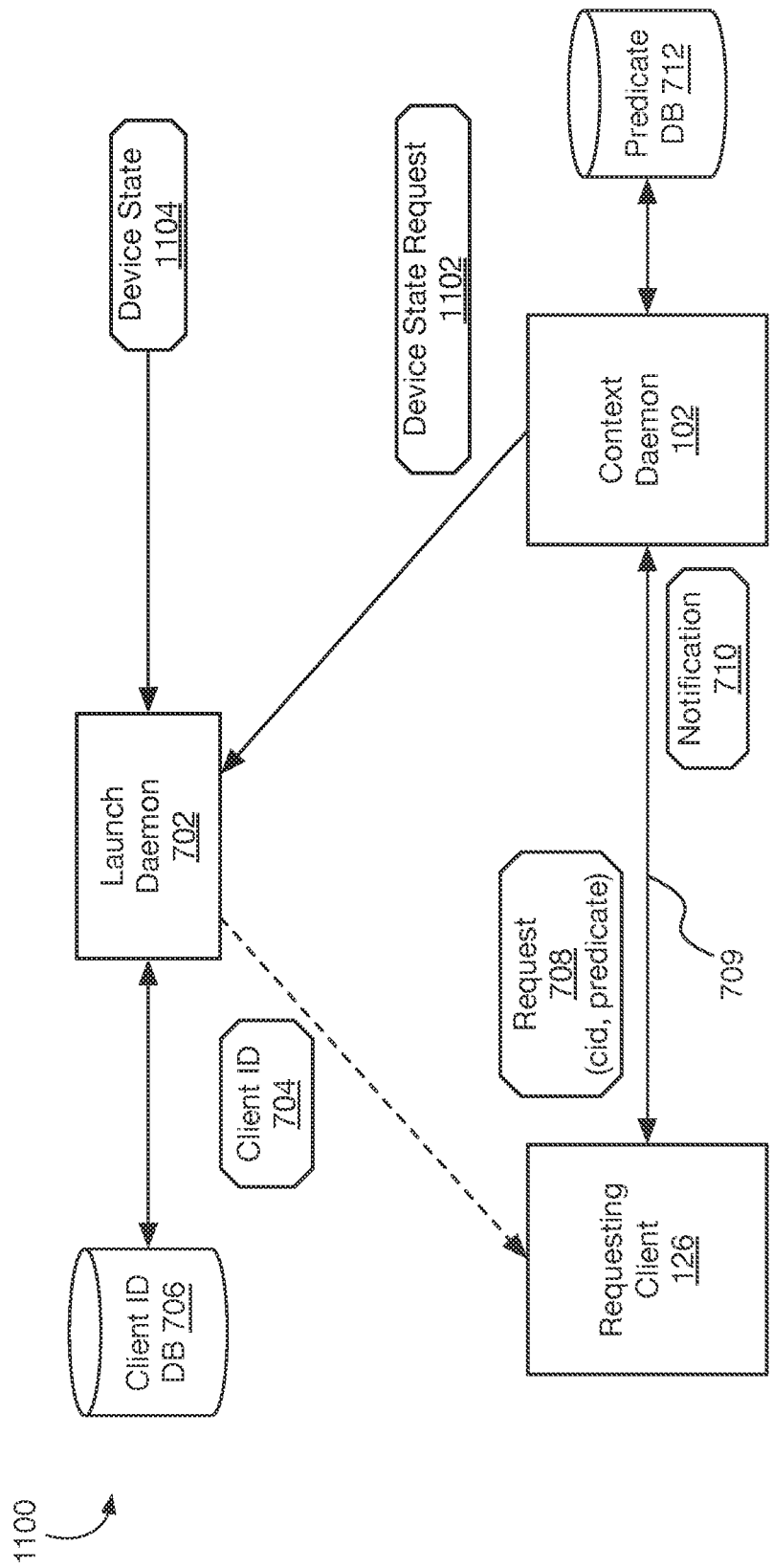
FIG. 11 is a block diagram of an example system configured to restart a client and/or a context daemon based on device state information received by a launch daemon.

FIG. 11 is a block diagram of an example system 1100 configured to restart requesting client 126 and/or context daemon 102 based on device state information received by launch daemon 702. For example, system 1100 can correspond to system 700 and can perform similar functions as system 700, as described above.

In some embodiments, launch daemon 702 can be configured to receive device state 1104. For example, device state 1104 can be low-level concrete state data generated by various hardware and/or software components of the computing device. For example, launch daemon 702 can receive device state 1104 that includes location data generated by a location services component (e.g., GPS receiver. Wi-Fi or cellular data component, etc.) of the computing device. The received location information can be raw location state data (e.g., GPS coordinates). The raw location state data can be translated into high-level location information (e.g., home, work, etc.). Changes in the raw location data can happen more frequently than changes in the high-level location information (e.g., multiple GPS coordinates can be within the same high-level location information). In some embodiments, device state 1104 can indicate a change in location but can be configured to not provide high-level location information (e.g., human-readable labels).

For example, requesting client 126 can send callback request 708 to context daemon 102 that has a location-based predicate. The predicate can specify that the requesting client 126 should be notified when the current location (e.g., current context) of the computing device is the user's home (e.g., location=home). To determine that the device location is the user's home, context daemon 102 and/or monitor bundle 106 can collect information from location API 132 and a contacts application running on the user's device that defines where "home" is located (e.g., that defines the geographic location associated with the "home" label). The location information from location API 132 can be raw location state data. Context daemon 102 can analyze and translate the raw location state data received from location API 132 into high-level location information (e.g., home, work, etc.). Context daemon 102 can register the raw location state data and changes in the raw location state data. The changes in raw location state data can be more frequent than changes in high-level information (e.g., multiple GPS coordinates can be within the same high-level location information). Context daemon 102 can determine when the context item "location" is equal to "home" (e.g., high-level location information) by comparing the raw location state data determined from location API 132 to the definition of "home" in the contacts application. For example, the raw location state data from location API 132 can be analyzed by context daemon 102. Context daemon 102 can determine from the raw location state data, the high-level location information of the requesting client 126 and when a change in the raw location state data is sufficient to reflect a change in the high-level location information of requesting client 126 (e.g., change from at home to not at home or vise versa). When the change in the raw location state data is sufficient, the predicate can be analyzed to determine if the requesting client should be notified (e.g., "home" or "not home"). When a change of location is not sufficient, the requesting client 126 is not notified preserving CPU cycles and memory until a future location change is sufficient to change the location. As demonstrated with this example, determining that the location predicate defined by requesting client 126 (e.g., "home") is satisfied depends on combining both current geographic location data (e.g., grid coordinates) with user data that correlates a label (e.g., "home") with a geographic location. Thus, the abstract location context "home" can be determined by analyzing concrete state data generated by the computing device's location services and contacts application. The abstract location context "home" (or any other abstract location, e.g., work, gym, etc.) can be set by the user and can be changed by the user or be updated over time.

In some embodiments, when context daemon 102 receives callback request 708 from requesting client 126, context daemon 102 can send device state request 1102 to launch daemon 702 to register interest in state changes of specific components of the computing device. When device state 1104 is received by launch daemon 702, launch daemon 702 can determine that there has been state change with respect to the specified components and notify context daemon 102 and/or requesting client 126.

In some embodiments, device state request 1102 can specify that launch daemon 702 should notify context daemon 102 when the specified state changes occur. For example, when requesting client 126 sends a callback request to context daemon 102 that specifies a location-based callback predicate, context daemon 102 can send device state request 1102 to launch daemon 702 requesting that launch daemon 702 notify context daemon 102 when a location component state change is detected by launch daemon 702.

In some embodiments, device state request 1102 can specify that launch daemon 702 should notify requesting client 126 when the specified state changes occur. For example, when requesting client 126 sends a callback request to context daemon 102 that specifies a location-based callback predicate, context daemon 102 can send device state request 1102 to launch daemon 702 requesting that launch daemon 702 notify requesting client 126 when a location component state change is detected by launch daemon 702. In some embodiments, device state request 1102 can include client identifier 704 corresponding to requesting client 126 so that launch daemon 702 can determine which requesting client 126 to notify.

Figures 12A, 12B:
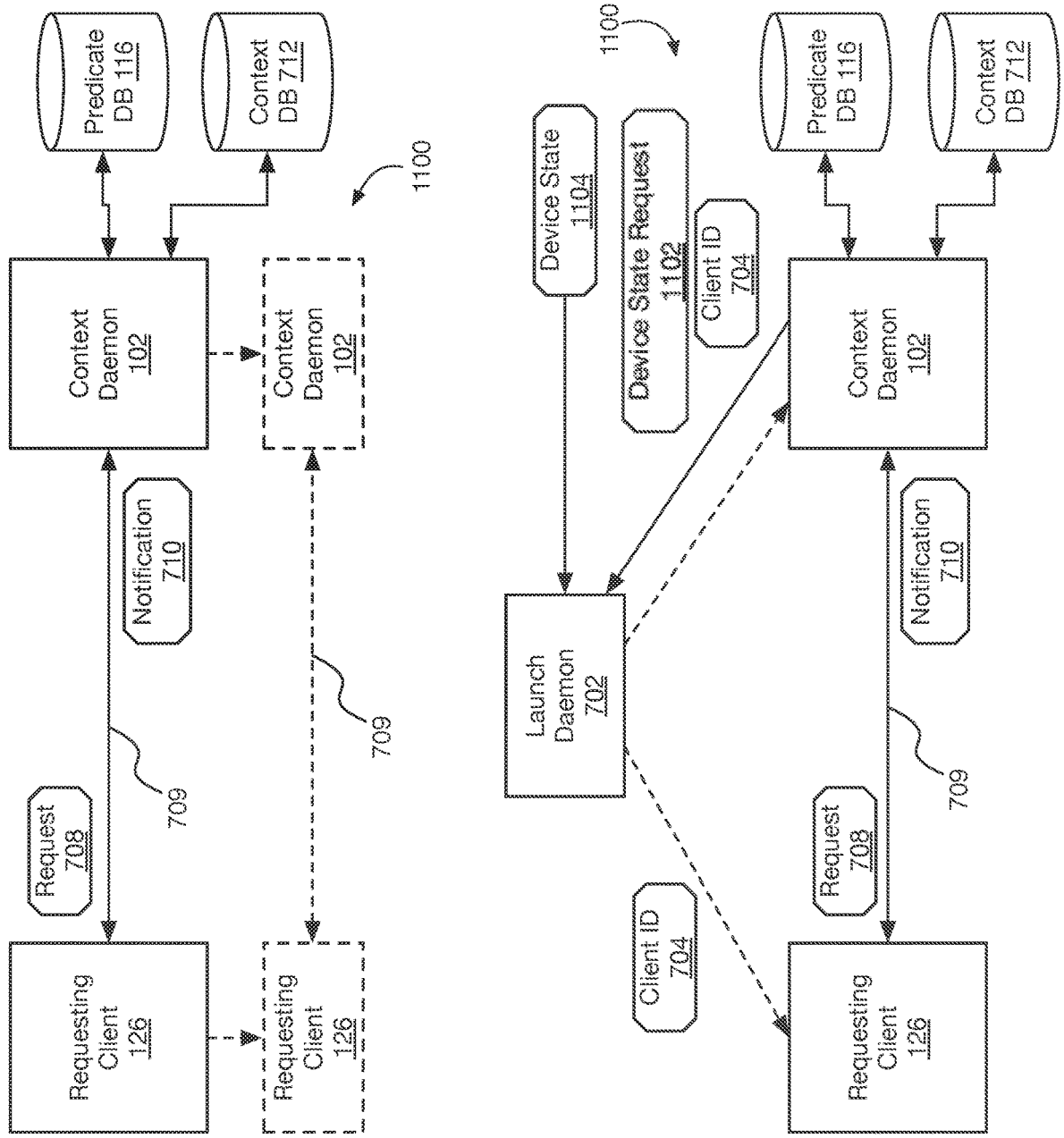
FIG. 12A is a block diagram of an example system illustrating restarting a context daemon using a launch daemon.
FIG. 12B is a block diagram of an example system illustrating restarting a context daemon using a launch daemon.

FIG. 12A and FIG. 12B are block diagrams of an example system 1100 illustrating restarting a context daemon using a launch daemon. For example, in FIG. 12A, system 1100 has determined that both context daemon 102 and requesting client 126 are idle and has terminated context daemon 102 and requesting client 126 (e.g., dashed outline indicating termination). In FIG. 12A, because both context daemon 102 and requesting client 126 are terminated, communication session 709 is also terminated.

FIG. 12B is a block diagram illustrating an example mechanism for restarting context daemon 102 using launch daemon 702 of system 1100. As described above with reference to FIG. 11, context daemon 102 can receive a callback request from requesting client 126 that specifies a context predicate for sending notification 710 from context daemon 102 to requesting client 126. In response to receiving the predicate, context daemon 102 can send device state request 1102 to launch daemon 702 to register interest in device state changes associated with the predicate. For example, if requesting client 126 specifies a location-based callback predicate, context daemon 102 can ask launch daemon 702 to notify context daemon 102 when the location of the computing device changes. When launch daemon 702 receives device state 1104 that indicates a change in location, launch daemon 702 can attempt to notify context daemon 102. Continuing the example of FIG. 12A, since context daemon 102 is not running on the computing device, launch daemon 702 can determine that context daemon 102 is not running and launch (e.g., restart, initiate, invoke, execute, etc.) context daemon 102. Once context daemon 102 is restarted, context daemon 102 can request that launch daemon 702 restart requesting client 126, as described above with reference to FIG. 8B.

FIG. 13A and FIG. 13B are block diagrams of example system 1100 illustrating restarting a requesting client 126 using the launch daemon. For example, in FIG. 13A, system 1100 has determined that both context daemon 102 and requesting client 126 are idle and has terminated context daemon 102 and requesting client 126 (e.g., dashed outline indicating termination). In FIG. 13A, because both context daemon 102 and requesting client 126 are terminated, communication session 709 is also terminated.

FIG. 13B is a block diagram illustrating an example mechanism for restarting requesting client 126 using launch daemon 702 of system 1100. As described above with reference to FIG. 11, context daemon 102 can receive a callback request from requesting client 126 that specifies a context predicate for sending callback notification 710 from context daemon 102 to requesting client 126. In response to receiving the predicate, context daemon 102 can send device state request 1102 to launch daemon 702 to register interest in device state changes associated with the predicate on behalf of requesting client 126. For example, context daemon 102 can provide client identifier 704 to launch daemon 702 when registering interest in device state changes associated with the predicate. For example, if requesting client 126 specifies a location-based callback predicate, context daemon 102 can ask launch daemon 702 to notify requesting client 126 when the location of the computing device changes. When launch daemon 702 receives device state 1104 that indicates a change in location, launch daemon 702 can attempt to notify requesting client 126 (e.g., identified by client identifier 704). Continuing from FIG. 13A, since requesting client 126 is not running on the computing device, launch daemon 702 can determine that requesting client 126 is not running and launch (e.g., restart, initiate, invoke, execute, etc.) requesting client 126. Once requesting client 126 is restarted, requesting client 126 can cause launch daemon 702 to restart context daemon 102 by sending a message to context daemon 102, as described above with reference to FIG. 9B.

Predicting Future Events

In some embodiments, context daemon 102 can predict future events based on event stream information. For example, context daemon 102 can analyze historical context information (e.g., event streams, event stream objects, etc.) to determine historical user behavior patterns. Context daemon 102 can predict future user behavior based on these past behavior patterns. For example, predicable user behavior can include sleep patterns, working patterns, exercise patterns, eating patterns, and other repeating user behaviors. Context daemon 102 can determine when these user behaviors occur based on clues in the event streams that reflect how a user interacts with the computing device during these user activities.

For ease of explanation, the description that follows will describe an example sleep prediction embodiment based on historical device locked state event stream data. However, the mechanisms used for sleep prediction can be used to predict other user behaviors as well by analyzing other event stream data. For example, context daemon 102 can use location data to infer user working patterns. Context daemon 102 can use accelerometer data to infer user exercise patterns. Context daemon 102 can use application data (e.g., checking in at a restaurant on a social media software application) to infer user eating patterns.

In some embodiments, context daemon 102 can use device lock state event stream data to determine and/or predict user sleep patterns. For example, if the computing device (e.g., handheld device, smartphone, etc.) remains locked for a long period of time (e.g., 5 hours or more), then context daemon 102 can infer that the user is sleeping. In some embodiments, other event stream information (e.g., accelerometer data, application usage data, etc.) can be used to confirm the sleep patterns and/or the sleep prediction. In some embodiments, context daemon 102 can perform sleep prediction for the current day at some time after the user wakes up from the previous day's sleep and before the next predicted sleep period. For example, context daemon 102 can perform the calculations to predict the next sleep period upon detecting that the user has awakened from the current sleep period. For example, context daemon 102 can detect that the user is awake by determining that the current value for the "locked" context item is false (e.g., the user has unlocked the device) and that the current time is after the predicted sleep period ends.

Slot-Wise Prediction of Future Events

In some embodiments, context daemon 102 can perform slot-wise averaging to predict future events. For example, to predict (e.g., determine, calculate, etc.) user sleep patterns, context daemon 102 can analyze the locked state event stream described above. Context daemon 102 can analyze the locked state event stream by dividing the locked state event stream into consecutive 24-hour periods over the previous 28 days. Context daemon 102 can divide each 24-hour period into 96 15-minute slots. Context daemon 102 can determine the locked state for each 15-minute block in each 24-hour period. For example, if the computing device remained locked for the entire 15-minute slot, then the locked state for the slot can be true (e.g., 1). If the computing device was unlocked during the 15-minute slot, then the locked state for the slot can be false (e.g., 0). The locked state data for the 15-minute slots within each 24-hour period can be combined to generate 28 data vectors representing each of the previous 28 days. For example, each vector (e.g., having a length of 96) can include 96 locked state values corresponding to each of the 15-minute slots within a day. Context daemon 102 can then average each 15-minute slot over the 28-day period to determine the historical sleep pattern of the user.

FIG. 14 is a graph 1400 that illustrates an example of slot-wise averaging to predict future events. For example, graph 1400 illustrates using device locked state to determine sleep patterns and predict future sleep periods. For example, each horizontal line represents a locked state data vector for a 24-hour period. The 24-hour period can range from t−n to t+n, where 't' is some time corresponding to approximately the (e.g., presumed, typical, calculated, etc.) middle of the user's sleep cycle and 'n' can be 12. For example, if the typical person sleeps from 10 pm to 6 am, then the 't' can be 2 am. In graph 1400, 'C' represents the current day. Thus, C−1 is yesterday. C−2 is two days ago. C−7 is one week ago, and C−28 is four weeks ago. Each day has 96 corresponding 15-minute slots. For example, graph 1400 depicts the 15-minutes slots corresponding to 3:30-3:45 am, 5:00-5:15 am, and 6:15-6:30 am. While only three 15-minute slots are shown on graph 1400 for clarity, each vector has 96 15-minute slots and the operations described with reference to the three 15-minute slots on graph 1400 will be performed on each of the 96 slots in each 24-hour period.

With reference to vector C−1 on graph 1400, the value of one (e.g., 1, true) in the 3:30 slot and the 5:00 slot indicates that the computing device remained locked during the entire corresponding 15-minute slot. The value of zero (e.g., 0, false) during the 6:15 slot indicates that the computing device was unlocked sometime during the 15-minute period. For example, context daemon 102 can infer that the user must have been awake to unlock the computing device in the 6:15 slot. Context daemon 102 can infer that the user was asleep when the device remains locked for a threshold period of time (e.g., 5 hours), as described further below.

To determine the probability that the user will keep the computing device locked during each 15-minute slot (and therefore remained asleep) in the current day, context daemon 102 can average the values of each 15-minute slot over the previous 28 days to predict values for each 15-minute slot in the current 24-hour period. Context daemon 102 can use the average 15-minute slot values calculated for the current 24-hour period to identify a period of time in the current 24-hour period that exceeds a sleep threshold (e.g., 5 hours) where the device is likely to remain locked. For example, where the average value for a 15-minute slot is above some threshold value (e.g., 0.5, 50%, etc.), then context daemon 102 can determine that the computing device will remain locked within that 15-minute slot. Context daemon 102 can determine a contiguous (or mostly contiguous) series of 15-minute slots having values greater than the threshold value that, when combined, exceeds the sleep threshold period of time. Once the series of 15-minute slots is determined, context daemon 102 can identify the period of time covered by the series of 15-minute slots as the predicted sleep period.

In some embodiments, context daemon 102 can perform weighted averaging across locked state data vectors. For example, each vector can be weighted such that older locked state data is less influential on the average than newer locked state data. In some embodiments, context daemon 102 can perform short term averaging over a series of recent days (e.g., over each of the last 7 days) and/or long term averaging over a series of weeks (e.g., 7 days ago, 14 days ago, 21 days ago, 28 days ago). For example, short term averaging may be better for predicting daily patterns, while long term averaging may be better for predicting what the user does on a particular day of the week. For example, if today is Saturday, the user's activities on the previous Saturday may be a better predictor of the user's behavior today than the user's activities yesterday (e.g., on Friday), especially if the user works Monday-Friday.

Short-Term Averaging

In some embodiments, the following short-term weighting averaging algorithm can be used by context daemon 102 to determine the probability ($P_S$) that the device will remain locked within a 15-minute slot:

$$P_s = \frac{(\lambda_s V_1 + \lambda_s^2 V_2 \ldots + \lambda_s^7 V_7)}{(\lambda_s + \lambda_s^2 \ldots + \lambda_s^7)}$$

where $V_1$ corresponds to C–1, $V_2$ corresponds to C–2, etc., and $V_7$ corresponds to C–7, and $\lambda$ is an experimentally determined weight having a value between zero and one. For example, the short term weighting algorithm can be used to calculate a weighted average of each 15-minute over the previous seven days.

Long-Term Averaging

In some embodiments, the following long-term weighted averaging algorithm can be used by context daemon 102 to determine the probability ($P_L$) that the device will remain locked within a 15-minute slot:

$$P_L = \frac{(\lambda_L V_7 + \lambda_L^2 V_{14} + \lambda_L^3 V_{21} + \lambda_L^4 V_{28})}{(\lambda_L + \lambda_L^2 + \lambda_L^3 + \lambda_L^4)}$$

where $V_7$ corresponds to C–7, $V_{14}$ corresponds to C–14. $V_{21}$ corresponds to C–21, and $V_{28}$ corresponds to C–28, and 'λ' is an experimentally determined weight having a value between zero and one. For example, the long-term weighting algorithm can be used to calculate a weighted average of each 15-minute for the same day of the week over the last four weeks.

In some embodiments, the short-term weighed averaging algorithm and the long-term weighted averaging algorithm can be combined to generate a combined (e.g., composite, overall, etc.) probability (P) that a 15-minute slot will remain locked within a 15-minute slot as follows:

$$P = \frac{P_S + rP_L}{1 + r}$$

where 'r' is an experimentally determined number (e.g., 0.5) that can be used to tune the influence that the long-term weighted average has on the probability calculation.

Proportional Slot Values

Figure 15:
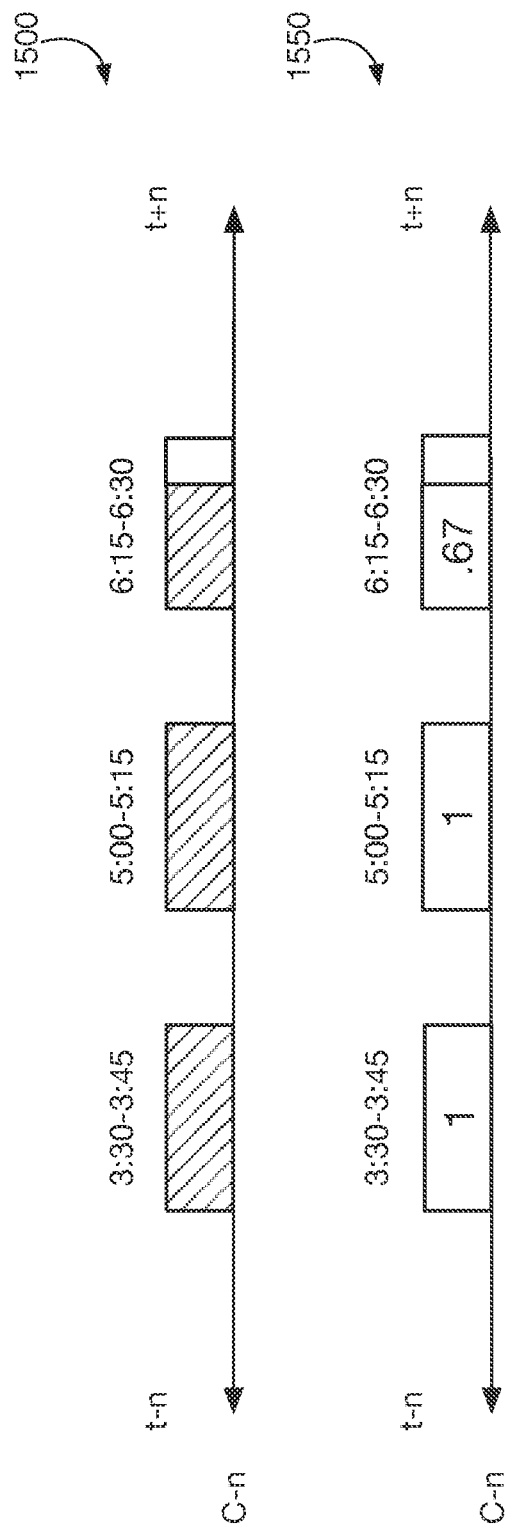
FIG. 15 depicts example graphs illustrating slot weighting.

FIG. 15 depicts example graphs 1500 and 1550 illustrating calculating proportional slot values. For example, rather than assigning true (1) and false (0) values for each 15-minute slot within a 24-hour period C-n, as in the description above, context daemon 102 can determine during how much of each 15-minute slot the computing device was locked, or unlocked, and assign a proportional value to the slot representing the proportionate amount of time within the slot during which the device was locked.

Referring to graph 1500, the shaded region of each 15-minute timeslot can represent the time within the timeslot during which the device was locked. For example, the device was locked during the entirety of both 3:30-3:45 am and 5:00-5:15 am timeslots. Thus, the 3:30 and 5:00 timeslots can be assigned a value of one (1). However, the computing device was locked for only a portion of the 6:15-6:30 am timeslot. If the computing device was locked for the first 10 minutes of the 6:15 timeslot, then the 6:15 timeslot can be assigned a value of 10/15 or 0.67 representing the proportionate amount of the 15-minute slot during which the device was locked, as illustrated by graph 1550. If the computing device was locked and unlocked repeatedly (e.g., locked for 5 minutes, unlocked for 2 minutes, locked for 1 minute, unlocked for 5 minutes, etc.), the computing device can add up the locked time periods, add up the unlocked time periods, and calculate the proportion of the 15-minute slot during which the computing device was locked. In some embodiments, a proportional value can be determined for each 15-minute timeslot within a 24-hour period (e.g., data vector). In some embodiments, the proportional value for each 15-minute timeslot can be used when calculating the short-term and/or long-term probabilities described above.

Generating a Sleep Curve

Figure 16A:
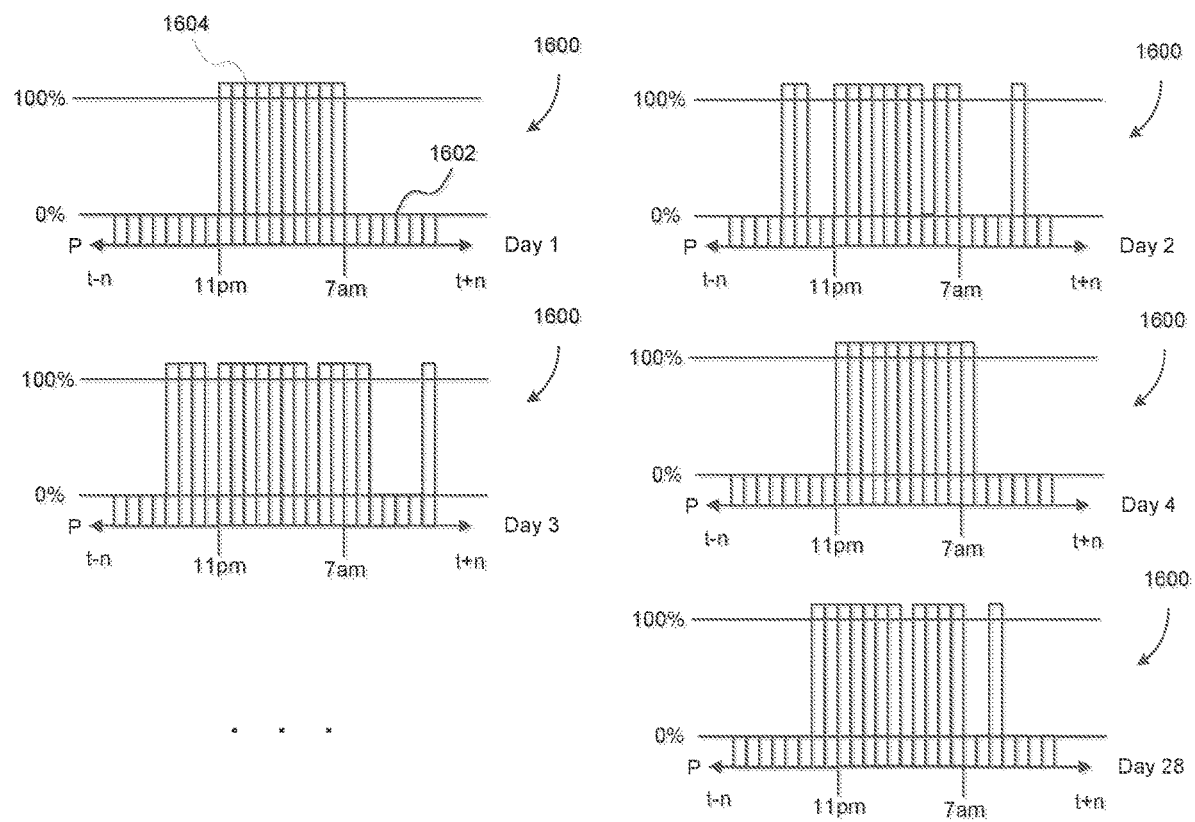
FIG. 16A is a series of graphs illustrating an example method for predicting a future context.
Figure 16B:
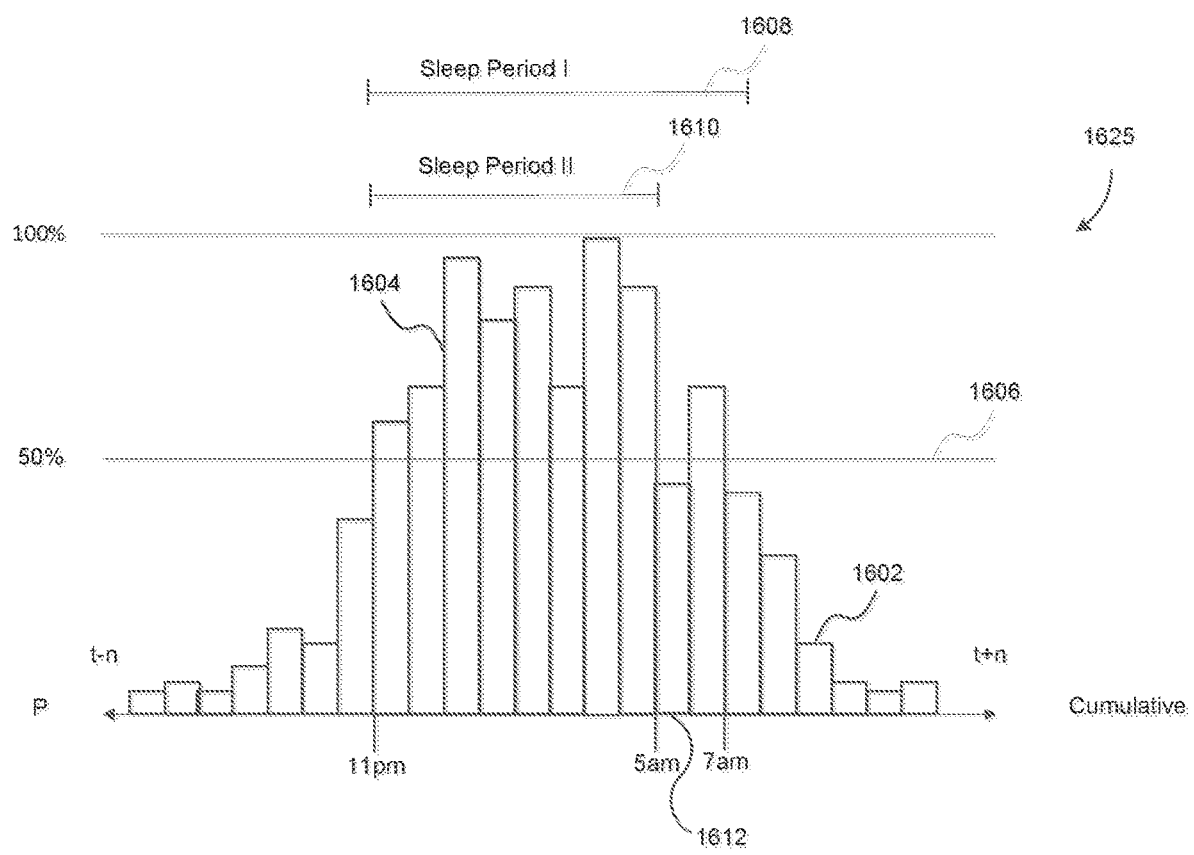
FIG. 16B is a cumulative graph illustrating an example method for predicting a future context.

FIG. 16A is a series of graphs 1600 illustrating an example method for presenting measured data representing a context, such as a sleep state, over a period of days. FIG. 16B is a cumulative graph 1625 derived from data in graphs 1600 illustrating an example method for predicting a future context over a period of days. For example, the method illustrated by graphs 1600, 1625 can be used to predict a future sleep period for a user of the computing device. For example, each column (e.g., column 1602, column 1604) in graphs 1600, 1625 can represent a 15-minute timeslot, as described above. The value of each 15-minute timeslot can be represented by the height of the column, and represents a measurement (graphs 1600) or probability (graph 1625) of whether the computing device is in a sleep state or not. In graph 1600, the height can correspond to a binary value. For example, the probability (P) can range from zero (e.g., 0, 0%) to one (e.g., 1, 100%). A probability of "1" means that it was observed that the device was locked for that 15 minute period and a probability of "0" means that it was observed that the device was unlocked in that 15 minute period. In graph 1625 the height can correspond to the combined weighted average probability (P) for the timeslot as described above. The probability can represent, for example, the probability that the computing device will remain locked during the 15-minute slot, as described above. In some embodiments, the probability can be calculated from the binary (e.g., 0, 1) 15-minute timeslot values. In some embodiments, the probability can be calculated from proportional 15-minute timeslot values (as shown in FIG. 15). While the heights of the columns in FIG. 16A (and curves in FIG. 16C) appear to extend beyond the threshold (0%, 100%, etc.), this is just for clarity of illustration.

As shown in FIG. 16A, the measurements for the timeslots can be taken each day for a period of days (e.g., 7 days, 14, days, 21 days, 28 days, etc.). After Day 1, a first graph is determined for each timeslot. After Day 2, a cumulative graph (e.g., as shown in FIG. 16B) is determined by combining (e.g., average, median, etc.) the first graph and a second graph from Day 2. The graphs can be combined by timeslot (i.e., the first 15-minute timeslot from the first graph is combined with the first 15-minute timeslot from the second graph, and so on). After Day 3, the cumulative graph can be altered to include a third graph from Day 3 by combining the cumulative graph and the third graph. This process can continue for the determined period of days (e.g., 28 days) and can maintain data for the most current period (e.g., last 28 days).

In some embodiments, context daemon 102 can determine the sleep cycle of a user of the computing device. For example, context daemon 102 can determine a sleep probability threshold value 1606 for determining which 15-minute slots correspond to the user's sleep period. In some embodiments, the sleep probability threshold value 1606 can be dynamically determined. For example, given a minimum sleep period (e.g., 5 hours, 7 hours, etc.), context daemon 102 can determine a value (e.g., 0.65, 50%, etc.) for sleep probability threshold 1606 that results in a block of contiguous 15-minute slots that is at least as long as the minimum sleep period and that includes 15-minute slots having (e.g., probability, average) values that exceed sleep probability threshold 1606. Stated differently, context daemon 102 can adjust sleep probability threshold 1606 up and down until a series of 15-minute slots that when combined meet or exceed the minimum sleep period and have values above the sleep probability threshold. The threshold value 1606 can also be defined based on the application (e.g., sleep prediction, exercise prediction, etc.). In some embodiments, the threshold value 1606 can be user-defined.

In some embodiments, once sleep probability threshold 1606 is determined, context daemon 102 can determine the user's sleep period (e.g., 1608, 1610). Sleep period I 1608 can be based on non-contiguous 15-minute timeslots (e.g., including an outlier 1612, as discussed below). Sleep period II 1610 can be based on the contiguous 15-minute slots. For example, sleep period 1610 can correspond to the time period covered by the contiguous 15-minute timeslots above threshold 1606 (e.g., not including column 1612). Referring to FIG. 16B, sleep period I 1608 can correspond to the time period beginning at 11 pm and ending at 7 am and sleep period II 1610 can correspond to the time period being at 11 PM and ending at 5 am. Sleep period I 1608 is based on the assumption that if the user is considered asleep for all periods except one or two short periods between 11 pm and 7 am, that the sleep period should be considered the whole period. While Sleep period II 1610 is based on the assumption that sleep should be defined as a period of continuous sleep. Both periods can also include the assumption that the sleep should be in the same location, and that there is only one sleep period per 24 hours.

Figure 16C:
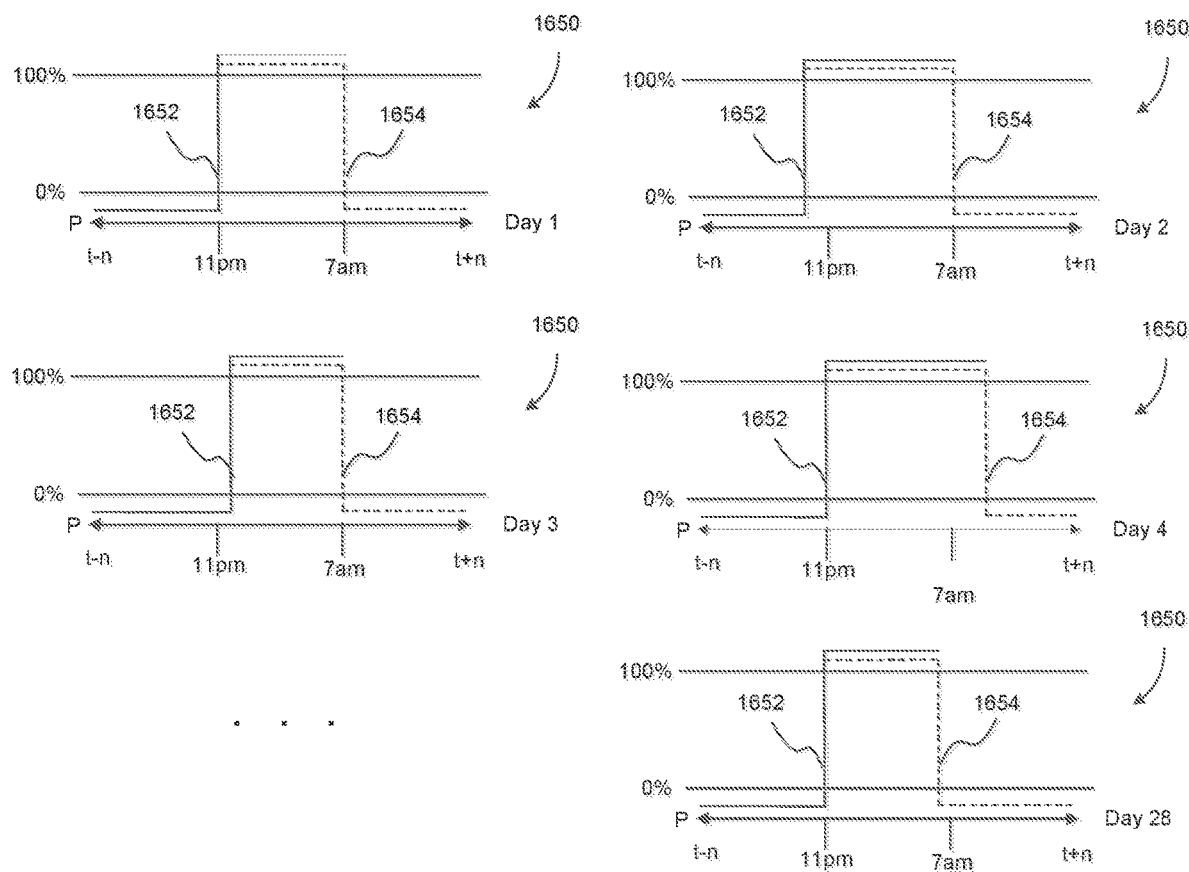
FIG. 16C is a series of graphs illustrating an example method for predicting a future context using a probability curve.
Figure 16D:
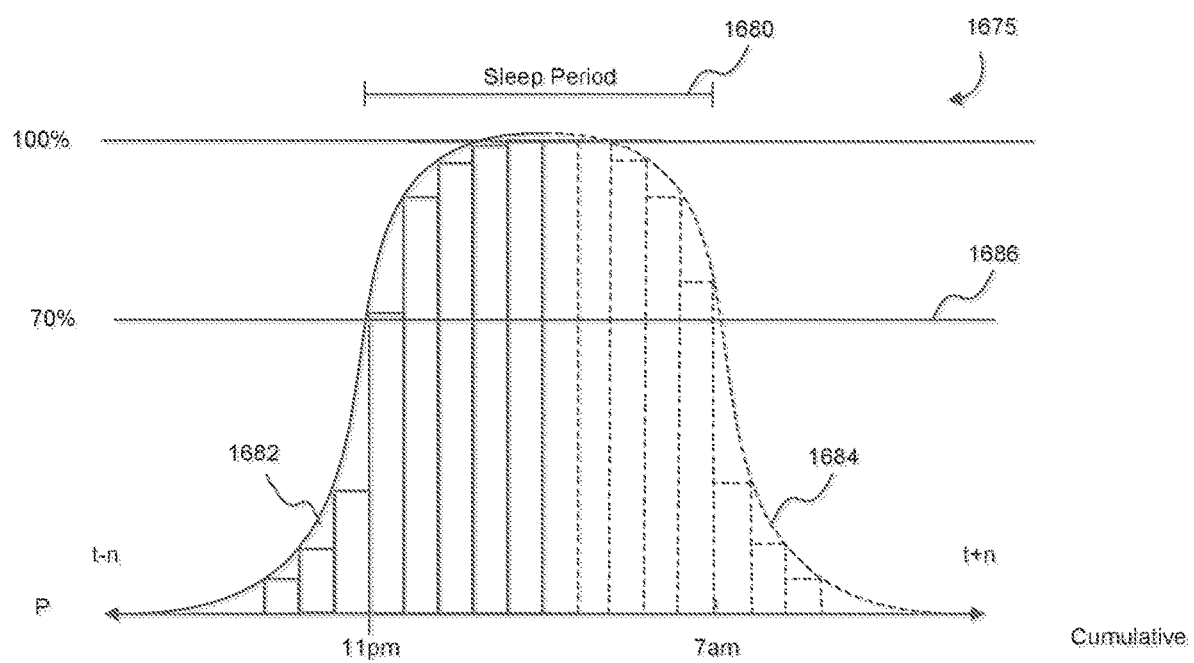
FIG. 16D is a cumulative graph illustrating an example method for predicting a future context using a probability curve.

FIG. 16C is a series of graphs 1650 illustrating another example method for representing a measured context, such as sleep periods, to be used for predicting future contexts over a period of days. FIG. 16D is a cumulative graph 1675 illustrating another example method for determining a probability curve for predicting future contexts based on the measured data over the period of days. As shown in FIG. 16C, a sleep curve can be created based on the measured raw data of each timeslot (while the timeslots are not individually shown in FIG. 16C, the data collection is similar to that shown in FIG. 16A with recorded periods of observed locked or unlocked states) over a predetermined period (e.g., 7 days, 14 days, 21 days, 28 days, etc.). The sleep curves in FIG. 16C, are generated using a unimodal curve, wherein a single rise in the curve represents the sleep period. The sleep period represents the single longest contiguous period where the device is in an unlocked state (timeslots as binary high (e.g., 1, 100%)), and not changing locations. In some embodiments, the sleep period may also be limited to common sleeping hours. While the sleep-side and wake-side curves appear to have different heights, this is just for clarity of illustration; both sides of the curve actually have the same height.

To predict the user's sleep cycle (e.g., assuming a user has one sleep cycle per 24-hour period), it can be useful to generate a cumulative probability curve 1682, 1684 (e.g., a unimodal curve) over a period of days that monotonically increases (e.g., increasing probability that the device will remain locked) as the user is entering a sleep cycle and monotonically decreases (e.g., decreasing probability that the device will remain locked) as the user is exiting the sleep cycle. While cumulative probability curve 1682, 1684 appear to show a time period for 11 pm to 7 am, this is just for clarity of illustration; the cumulative probability curves extend for a 24-hour period.

In some embodiments, the cumulative probability curve can be calculated based on combining the collection of sleep-side and wake-side curves for every day in the period for which there is data. For example, after Day 1, a first sleep-side and wake-side curves are determined for the sleep period. After Day 2, a cumulative graph of the first sleep-side and wake-side curves from Day 1 are combined (e.g., average, median, etc.) with second sleep-side and wake-side curves from Day 2. After Day 3, the cumulative graph can be altered to include the curves from Day 3 and so on. This process can continue for the determined period of days (e.g., 28 days) and can maintain data for the most current period (e.g., last 28 days).

FIG. 16D illustrates two different possible representations of the cumulative sleep-side and wake-side curves. One representation is a smooth curve that is a best fit of the sleep-side and wake-side curve. The other representation is a step curve, which more accurate reflects the combination of the data. Again the representative of the sleep-side curves are show in solid lines and the representation of the wake-side curves are shown in dotted lines.

As addressed above, the individual sleep-side and wake-side curves can be converted into a cumulative probability curve (e.g., sleep-side 1682, wake-side 1684) by taking the average of the sleep-side and wake-side curves as described above. Once the cumulative probability curve has been calculated, a sleep period 1680 (including a predicted start sleep time and predicted stop steep time) can be determined. The cumulative sleep curve can represent a contiguous portion of the sleep-side 1652 and wake-side 1654 step functions over a period of time. When cumulative probability curve 1682, 1684 is greater than (i.e., above) the threshold value 1686 for the largest contiguous period (e.g., sleep period 1680) the user is predicted as sleeping, or more accurately, the computing device is predicted to be in and remain in a locked or sleep state. When cumulative probability curve 1682, 1684 is less than (i.e., below) the threshold value 1686 the user is predicted as awake, or more accurately, the computing device is predicted to be potentially unlocked or in use at some point during this period. In some embodiments, a start sleep time can be predicted based on the intersection of the sleep-side 1682 of the cumulative probability curve and threshold 1686 (e.g., 11 PM, as illustrated in FIG. 16D). In some embodiments, a stop sleep time can be predicted based on the intersection of the wake-side 1684 of the cumulative probability curve and threshold 1686 (e.g., 7 AM, as illustrated in FIG. 16D). In other examples, the intersection of the cumulative probability curve and a timeslot can be used.

In some embodiments, there is a single sleep period in every day (e.g., 24 hour period). Thus, there will only be one sleep-side curve (non-decreasing) and one wake-side curve (non-increasing) per sleep period. The sleep-side curve (e.g., non-decreasing curve) can be defined, as the probability a user is asleep before a specific time. For example, at time t, a probability curve can be calculated (e.g., as shown above) to predict the start sleep time (e.g., 11 PM). The probability can be calculated using cumulative data (e.g., over a 28 day period), and be based on the lock state of the user device (e.g., lock can equal asleep). The wake-side curve (e.g., non-increasing curve) can be defined, as the probability a user is awake before a specific time. For example, at time t a probability curve can be calculated (e.g., as shown above) to predict the stop sleep time (e.g., 7 AM). The probability can be calculated using cumulative data (e.g., over a 28 day period), and be based on the lock state of the user device (e.g., unlock can equal awake). The entire sleep probability curve can be calculated by combining the sleep-side curve and the wake-side curve. The probability curve can be determined by calculating the min( ) function of the sleep-side and wake-side at a particular time t, the cumulative probability curve can be calculated, as shown in FIG. 16D. For example, over a 24-hour period, at time 0 (e.g., noon) the sleep-side curve can be 0% and the wake-side curve can be 100% and at time 12 (e.g., midnight) the sleep-side curve can be 100% and the wake-side curve can be 0%.

In some embodiments, to generate a cumulative probability curve, context daemon 102 can use the sleep probability threshold value 1686 determined above to convert the probabilities (e.g., averages) calculated for each 15-minute timeslot into binary (e.g., 1 or 0) values. For example, 15-minute timeslots within the sleep period (e.g., greater than sleep threshold value 1686) can be assigned a value of one (1) and 15-minute timeslots outside of the sleep period (e.g., less than the sleep threshold value 1686) can be assigned a value of zero (0). Once binary values are assigned to each 15-minute timeslot, context daemon 102 can fit a curve (e.g., probability curve 1682, 1684) to the binary values. Once generated, context daemon 102 can use probability curve 1682, 1684 to estimate the probability that the user will be asleep at a particular time of day and/or for a particular period of time during a day. For example, context daemon 102 can use probability curve 1682, 1684 to predict when the user is likely to be asleep in the future. Referring to FIG. 16D, since the calculated sleep period 1680 represented by graph 1675 falls between 11 pm and 7 am, context daemon 102 can predict that the user will be asleep between 11 pm and 7 am in the future. For example, if the sleep prediction is done on a daily basis (e.g., after the user wakes in the morning), context daemon 102 can predict that the user will sleep between 11 pm and 7 am later in the current day. The definition of a day can be based on a calendar standard, or can be any 24 hr period. In some embodiments it can be desirable for the day to be considered from 4 pm local time to 3:59 pm local time the next day. In such instances, a context daemon 102 can predict the next sleep period, even if it falls within the next day (i.e., after 4 pm local time).

In some embodiments, predicting a future context can be slot-less, i.e. for embodiments where the context is sleep it may not be necessary to measure a context in 15 minute increments. For example, when determining a sleep cycle, the day can include only one sleep cycle. Thus, the computing device can measure intervals between unlock states and retain only the longest interval. The interval need not begin or end with the start of a specific increment or period. This method would be similar to that described in FIG. 16C and FIG. 16D, wherein sleep curve is determined to be the longest interval between unlock states. Each daily sleep curve can be combined into a cumulative curve to be used in predictions.

Handling Irregularities—Outliers and Missing Data

In some embodiments, context daemon 102 can be configured to handle outlier data within the historical event stream data. In some embodiments, context daemon 102 can be configured to handle outlier 15-minute slots within a block of time that would otherwise correspond to a sleep period. For example, a block of time (e.g., a block of contiguous 15-minute slots that have values exceeding the sleep threshold value and which combined exceed the minimum sleep period) that might be a candidate for a sleep period can include a 15-minute slot that does not exceed the sleep threshold value. For example, if the minimum sleep period is five hours, there are at least twenty 15-minute slots within the sleep period. When there are twenty 15-minute slots, there can be ten slots that exceed the sleep threshold value, followed by one (e.g., outlier) slot that does not exceed the sleep threshold value, followed by nine slots that exceed the sleep threshold value. An example of this scenario can be seen with reference to FIG. 16B where outlier slot 1612 does not exceed sleep threshold 1606 and is surrounded by slots (e.g., 1604) that do exceed sleep threshold 1606. When there is a small number (e.g., one, two) outlier 15-minute slot within a block of 15-minute slots that exceed the sleep threshold value, then context daemon 102 can treat the outlier 15-minute slot as if it exceeded the sleep threshold value so that the sleep period (e.g., sleep curve) can be generated, as described above. For example, when determining the block of contiguous 15-minute slots that correspond to the sleep period, context daemon 102 can ignore outlier 15-minute slots. When converting the 15-minute slots to binary values to generate the probability curve (as in FIG. 16B), context daemon 102 can assign the outlier 15-minute slot a value of one so that the probability curve can be generated.

In some embodiments, context daemon 102 can be configured to handle outlier days (e.g., 24-hour periods, historical data vectors, etc.) within a historical event stream when predicting a sleep period. For example, before calculating short-term averages, context daemon 102 can compare the locked event data (e.g., historical context data) for the previous seven days. For example, context daemon 102 can perform a similarity analysis on the historical data vectors for each of the previous seven 24-hour periods. If the data for one of the seven days (e.g., an outlier day) is completely different than the other six days, then context daemon 102 can remove the outlier day from the short-term average calculation. For example, small day-to-day variations in historical device lock state data for a 15-minute slot can be normal. However, a shift in a large block of lock data (e.g., corresponding to a user sleep period) can be abnormal. Context daemon 102 can detect the outlier day by comparing day-to-day patterns in the historical data and detecting that the use patterns (e.g., user behavior) observed for one day do not correspond to the use patterns observed for other days in the week. For example, context daemon 102 can determine that a block of 15-minute slots in the outlier day (24-hour period) is unlocked when the same block of 15-minute slots is typically locked in other days. Once the outlier day is detected, context daemon 102 can omit the outlier day from the short-term averaging calculations described above.

Similarly, before calculating long-term averages, context daemon 102 can compare the locked event data (e.g., historical context data) for the same day of the week for the previous four weeks, for example. If the data for one of the days is significantly different than (e.g., an outlier day) the other four days, then context daemon 102 can remove the outlier day from the long-term average calculation. For example, week-to-week variations in historical device lock state data for a 15-minute slot can be normal. However, a shift in a large block of lock data (e.g., corresponding to a user sleep period) can be abnormal. Context daemon 102 can detect the outlier day by comparing week-to-week patterns in the historical data and detecting that the use patterns (e.g., user behavior) observed for one day do not correspond to the use patterns observed for the same day in previous weeks. Once the outlier day is detected, context daemon 102 can omit the outlier day from the long-term averaging calculations described above.

In some embodiments, context daemon 102 can detect an outlier day based on a shift in user behavior patterns. For example, if a user normally sleeps between 11 pm and 7 am, the historical locked event data will indicate that the device remained (mostly) locked between 11 pm and 7 am. However, on an rare day, the user can stay up all night studying or working, thus the sleep period for that day can shift to another period of time (e.g., 6 am to 12 pm). In some embodiments, context daemon 102 can detect this shift in sleep patterns based on the historical locked state data and remove this day from the averaging calculations.

In some embodiments, context daemon 102 can detect an outlier day based on known or commonly accepted limits in human behavior. For example, the user could go on a weekend trip and accidently leave the computing device (e.g., smartphone) at home for the entire weekend. In this case, the device will remain locked for the whole weekend (e.g., two days) thereby generating a block of locked data that can be erroneously interpreted by context daemon 102 as a sleep period. Context daemon 102 can detect this situation by comparing the period of time (e.g., the sleep period) corresponding to the block of locked data to a maximum sleep period (e.g., 12 hours, 24 hours, etc.). For example, the maximum sleep period can be based on common knowledge (e.g., humans do not usually sleep for more than 24 hours) or determined based on observed data (e.g., the maximum observed sleep period for a user is 10 hours). If the block of time exceeds the maximum sleep period, then context daemon 102 can ignore the day or days corresponding to this block of time when performing the long-term and/or short-term calculations described above.

In some embodiments, context daemon 102 can be configured to handle missing data in the historical event stream. For example, a user can turn off the computing device for a period of time or the device can lose battery power after being unplugged from an external power source for a long period of time. While the device is turned off, the device cannot collect context information and cannot generate a historical event stream. When the computing device is turned on again, context daemon 102 can attempt to predict future events (e.g., a future sleep period) based on the missing data corresponding to the period of time when the device was turned off. In this case, context daemon 102 can determine that no event (e.g., context item) data values exist for this period of time and ignore (e.g., omit) the day or days (e.g., historical data vector) corresponding to this period of time when performing the short-term and/or long-term averaging calculations described above.

Scheduling Activities Based on Predicted Events

Figure 17:
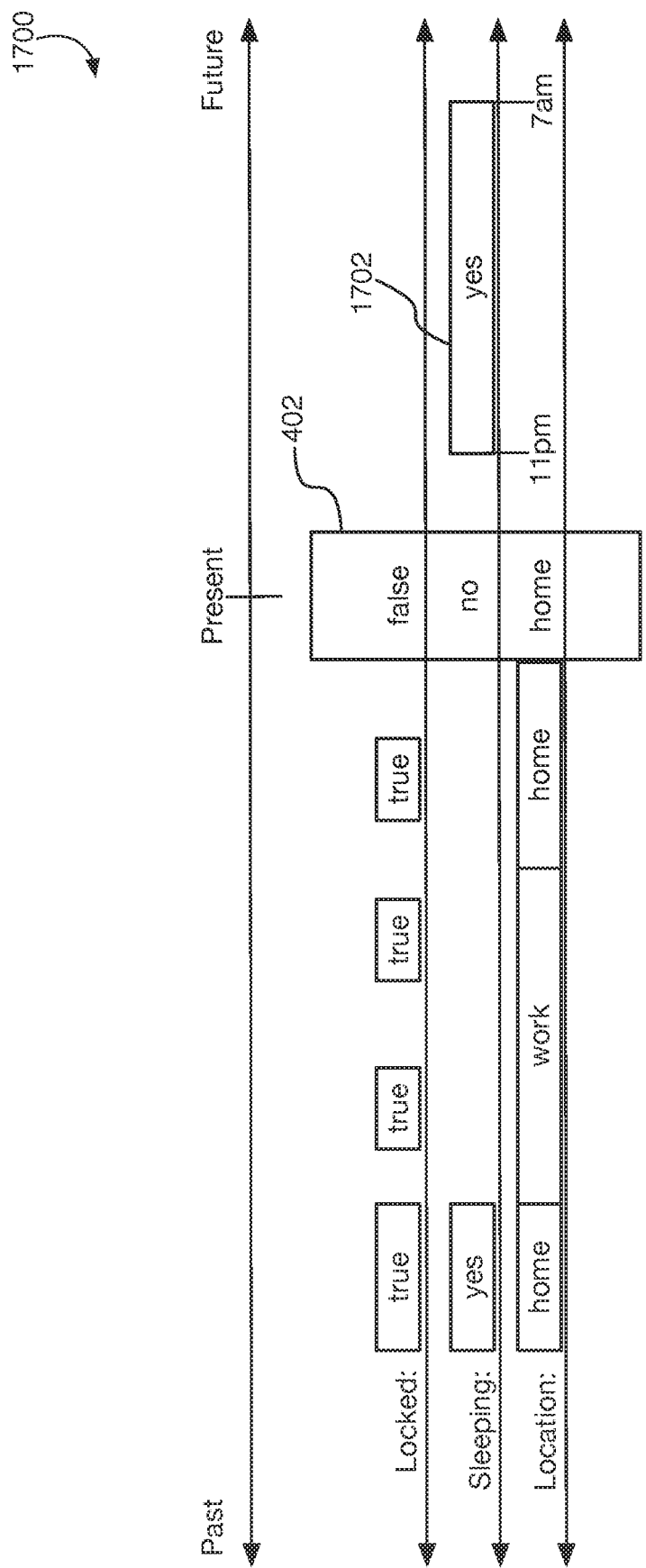
FIG. 17 illustrates an example event stream that includes a predicted future event.

FIG. 17 illustrates an example event stream 1700 that includes a predicted future event. For example, using the mechanisms described above, context daemon 102 can predict future sleep period 1702. In some embodiments, the predicted future event can be used to schedule activities (e.g., context callbacks) within the computing device. Referring to FIG. 1, requesting client 126 can request a callback notification in advance of a predicted event. For example, requesting client 126 can send context daemon 102 a callback request that includes a predicate that specifies that context daemon 102 should notify requesting client 126 thirty minutes before the user falls asleep. When the callback request is received, context daemon 102 can schedule the notification for thirty minutes before the predicted sleep period begins. Similarly, requesting client 126 can send context daemon 102 a callback request that includes a predicate that specifies that context daemon 102 should notify requesting client 126 one hour after the user falls asleep. When the callback request is received, context daemon 102 can schedule the notification for one hour after the predicted sleep period begins.

In some embodiments, context daemon 102 can confirm the prediction of a future event based on the current context at the predicted time of the event. For example, if requesting client 126 requests that context daemon 102 notify requesting client 126 thirty minutes after the predicted sleep period begins, context daemon 102 can confirm that the user is actually asleep at that time by analyzing current context 112 (e.g., context item values) to determine whether the device is locked. If the device is unlocked (e.g., the user is not asleep) thirty minutes after the predicted sleep period began, context daemon 102 will not notify requesting client 126. In some embodiments, other context information can be used to confirm a predicted sleep period. For example, accelerometer state can be used to confirm the sleep period. For example, most smartphone users will place the smartphone on a table or on the floor when going to sleep. Tables and floors are usually stationary objects. Thus, the smartphone will not generate much, if any, accelerometer data. If the smartphone is generating accelerometer data, the smartphone is most likely in motion (e.g., in the user's pocket while the user is moving). Thus, accelerometer data can indicate that the user is moving and not asleep during the predicted sleep period.

In some embodiments, context daemon 102 can improve the prediction of future events by identifying precursor events. For example, context daemon 102 can analyze historical event stream data to identify relationships between user activities and predicted events. For example, a user can have a habit of checking an email application, a social networking application, a news application, or another application before going to sleep. Context daemon 102 can detect these patterns (e.g., using an alarm clock application, then going to sleep) and identify the precursor application or applications (e.g., email application, clock application, news application, etc.). Once the precursor application (or applications) has been identified, context daemon 102 can use the precursor application to predict that the user is about to go to sleep. For example, context daemon 102 can determine based on historical event data that the user typically falls asleep 10 minutes after using an alarm clock application. If context daemon 102 has predicted that the user will go to sleep at 11 pm and the user is using the alarm clock application at 10 pm, context daemon 102 can adjust the start of the predicted sleep period from 11 pm to 10:10 pm based on the precursor alarm clock application activity. In some embodiments, context daemon 102 can adjust the start of the predicted sleep period by adjusting the start and stop times of the predicted sleep period without adjusting the duration of the predicted sleep period. In some embodiments, context daemon 102 can adjust the start of the predicted sleep period by adjusting the start time and not adjusting the stop time of the predicted sleep period thereby extending the duration of the predicted sleep period. Alternatively, when context daemon 102 detects that the user is using the precursor application (e.g., the current context indicates that the application in focus is the precursor application), context daemon 102 can monitor the user's activity to determine when the user locks the computing device and begin the current sleep period once the device is locked.

Other Use Cases

In some embodiments, context clients running on the computing device can use the sleep prediction described above to schedule background tasks while the user is asleep. For example, an operating system process (e.g., application updater) can need to schedule some system maintenance tasks (e.g., downloading and/or installing application updates) while the user is sleeping so that the user is not inconvenienced by the allocation of system resources to system maintenance. Context daemon 102 can analyze the state of various device components (e.g., hardware, software, etc.) to determine if the scheduled activity might interfere with any user activity, as described further below.

In some instances, the operating system process can need the user's passcode (e.g., password) before performing system maintenance tasks. Since the user will be unable to provide the passcode while the user is asleep, the operating system process can request a callback notification from context daemon 102 some time (e.g., 10 minutes) before the predicted sleep period for the user. Upon receipt of the callback request, context daemon 102 can schedule the callback notification for 10 minutes before the predicted sleep period begins. When the scheduled time arrives (e.g., the current time equals the scheduled time), context daemon 102 can send the callback notification to the operating system process. When the operating system process receives the callback notification, the operating system process can prompt the user to enter the user's passcode so that the operating system process can perform the maintenance tasks while the user is asleep. For example, the operating system process can receive the passcode from the user and store the passcode for use during performance of the system maintenance tasks. Once the system maintenance tasks are completed and the passcode is no longer needed, the operating system process can delete the user's passcode from the computing device.

To initiate the maintenance tasks while the user is sleeping, the operating system process can request a callback notification some time (e.g., 30 minutes) after the predicted sleep period begins. Upon receipt of the callback request, context daemon 102 can schedule the callback notification for 45 minutes after the predicted sleep period begins. When the scheduled time arrives (e.g., the current time equals the scheduled time), context daemon 102 can verify that the user is not using and/or not about to use, the computing device before sending the callback notification to the operating system process.

In some embodiments, context daemon 102 can verify that the user is not using the computing device by determining whether the computing device is servicing a user-initiated activity. For example, even though the computing device is locked (e.g., indicating that the user can be sleeping), the computing device can perform navigation related activities in service of a user navigation request. Thus, when context daemon 102 determines that navigation components (e.g., global navigational satellite system receivers) of the computing device are turned on, context daemon 102 can determine that user is using the computing device and cancel or delay sending the callback notification to the operating system process during the predicted sleep period. Similarly, when context daemon 102 determines that the computing device is providing a personal hotspot service, synchronizing data with another user device in response to a user request (e.g., in contrast to automatic background synchronizations), or providing some other user initiated service at the time when a callback notification is scheduled, context daemon 102 can cancel or delay sending the callback notification to the operating system process because the user is still using the computing device even though the device is locked.

In some embodiments, context daemon 102 can verify that the user is not about to use the computing device by determining whether the computing device is about to initiate a user-visible activity. For example, various processes running on the computing device can notify the user or get the user's attention. A communication application (e.g., instant messaging, text messaging, email, telephone, etc.) can remind the user about a received message. For example, the communication application can be configured to remind the user to read or respond to a received message ten minutes after the message was received. A clock application can include an alarm clock function that is configured to notify (e.g., wake) the user at some future time. A calendar application can be configured to remind a user about a scheduled calendar event in the future. If the user is scheduled to attend a meeting, a navigation application can present a time-to-leave reminder to the user based on the amount of time it will take the user to travel from the user's current location to the meeting location. An exercise application can be configured to remind the user to stand up, walk around, go for a run, or do some other type of exercise. Each of these notifications, reminders, alerts, etc., is directed to the user and will prompt or cause the user to interact with the computing device. Context daemon 102 can determine whether one of these user-visible events is about to occur within a threshold period of time (e.g., one minute, ten minutes, an amount of time needed to complete a system maintenance task, etc.) and delay or cancel sending the callback notification to the operating system process because the user is about to start using the computing device.

Processes

Figure 18:
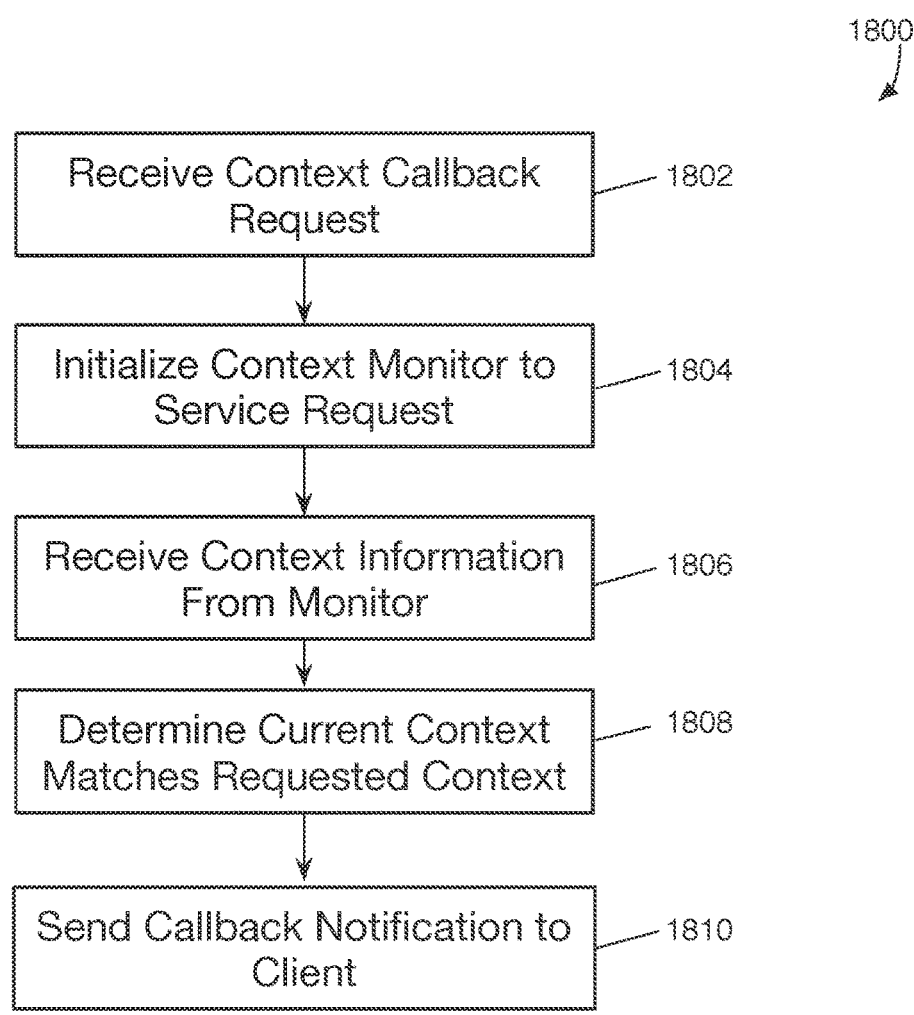
FIG. 18 is a flow diagram of an example process for notifying clients of context changes on a computing device.

FIG. 18 is a flow diagram of an example process 1800 for notifying clients of context changes on a computing device. For example, a computing device corresponding to system 100, described above, can perform process 1800.

At step 1802, the computing device can receive a context callback request. For example, context daemon 102 can receive a callback request from requesting client 126, as described above. The callback request can include an identifier for requesting client 126 and a predicate that defines the context (e.g., device state) conditions under which context daemon 102 should send requesting client 126 a callback notification. In some embodiments, upon receiving the callback request, the context daemon 102 can generate a callback identifier that can be used by context daemon 102 and/or requesting client 126 to identify the callback request. For example, context daemon 102 can return the callback identifier to requesting client 126 in response to receiving the callback request from requesting client 126. Context daemon 102 can store the callback request in callback registry 114 and/or predicate database 116, for example.

At step 1804, the computing device can initialize a context monitor to service the callback request. For example, context daemon 102 can load a monitor bundle 106 (or bundles) corresponding to the context items specified in the callback request predicate, as described above.

At step 1806, the computing device can receive current context information from the context monitor bundle 106 (context monitor 108). For example, each context monitor 108 can interface with various system components to obtain the state of the system components. The context monitors 108 can then report the state to context daemon 102. Alternatively, context daemon 102 can receive state information from reporting client 124. Context daemon 102 can generate current context 112 based on the received state information, as described above.

At step 1808, the computing device can determine that the current context matches the requested context. For example, context daemon 102 can compare the context request predicate to the current context to determine that the current context satisfies the conditions specified in the predicate.

At step 1810, the computing device can send a callback notification to the requesting client 126. For example, in response to determining that the current context matches the requested context, context daemon 102 can send a callback notification to requesting client 126 that identifies the callback request. The requesting client 126 can use the callback request identifier to determine which callback predicate triggered the callback (e.g., to determine the current operational context of the computing device). Requesting client 126 can then perform an action appropriate to the current context.

Figure 19:
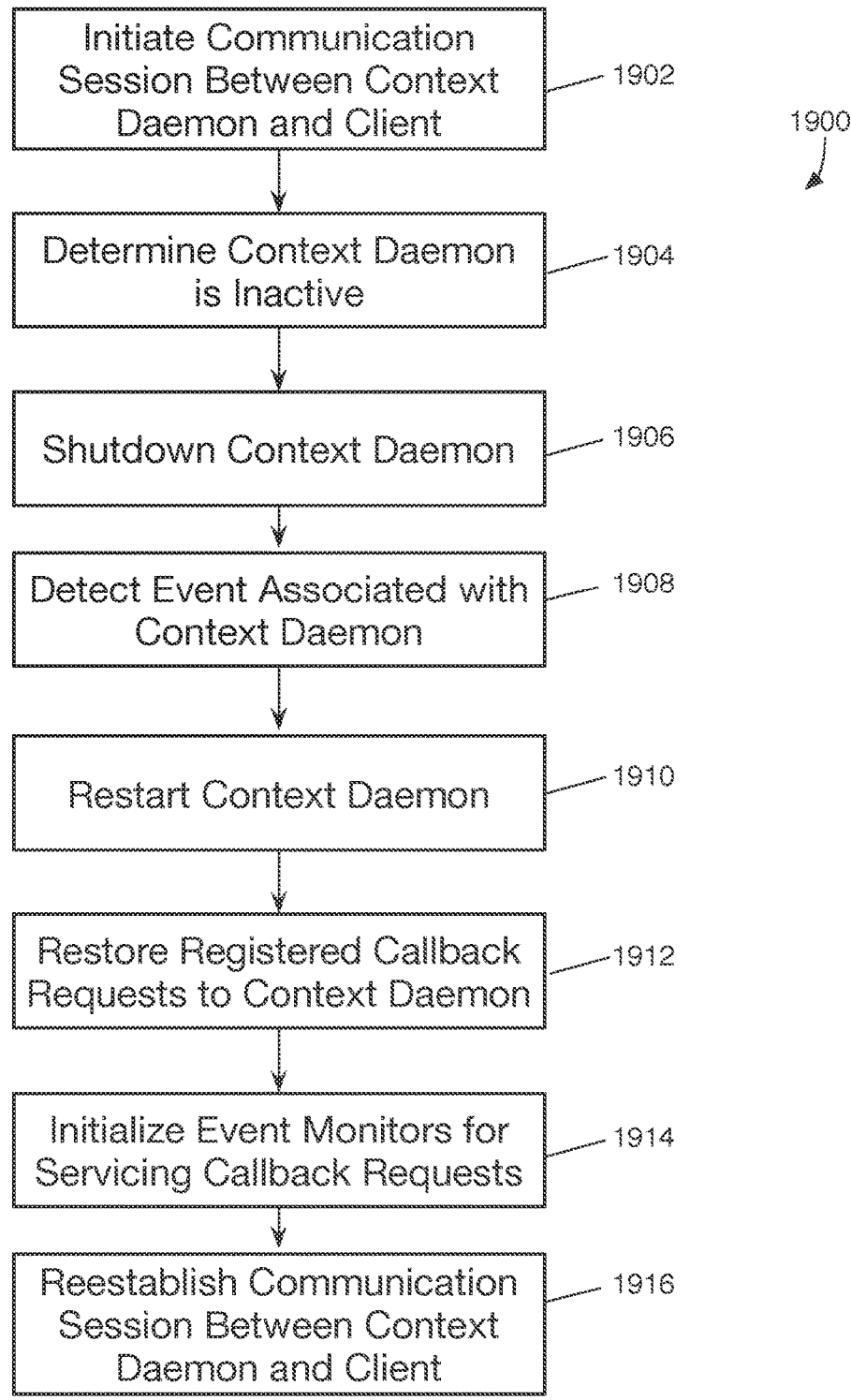
FIG. 19 is a flow diagram of an example process for restarting a context daemon to service a callback request.

FIG. 19 is a flow diagram of an example process 1900 for restarting a context daemon to service a callback request. For example, processes running on a computing device can be terminated by a process manager service of the operating system when the process manager determines that the process has been idle for a period of time. When the process manager (or some other process) terminates context daemon 102, the computing device can perform process 1900 to restart context daemon 102 so that context daemon 102 can collect context information and send callback notifications to requesting client 126. For example, process 1900 can correspond to the context daemon restart mechanisms described with reference to FIGS. 7-13.

At step 1902, the computing device can initiate a communication session between context daemon 102 and requesting client 126. In some embodiments, requesting client 126 can initiate a communication session with context daemon 102 by sending context daemon 102 a callback request, as described above. The callback request can include a client identifier and a callback predicate, as described above. In some embodiments, context daemon 102 can only communicate (e.g., send a callback notification) with requesting client 126 using a communication session initiated by requesting client 126. In some embodiments, context daemon 102 can store the callback request in a callback database (e.g., predicate database 116).

At step 1904, the computing device can determine that context daemon 102 is inactive. For example, when context daemon 102 does not receive any callback requests or context information updates for a period of time, the process manager can determine that context daemon 102 is idle or inactive.

At step 1906, the computing device can shutdown context daemon 102. For example, based on the determination that context daemon 102 is inactive, the process manager can shutdown or terminate context daemon 102 to conserve system resources (e.g., battery power, memory, etc.). Upon shutting down context daemon 102, the communication session between requesting client 126 and context daemon 102 will also be terminated.

At step 1908, the computing device can detect an event associated with context daemon 102. For example, the event can be a context client (e.g., requesting client 126, reporting client 124, etc.) sending a message to context daemon 102. For example, the message can be a callback request from requesting client 126. The message can be a context information update received from reporting client 124. In some embodiments, the event can be a device state update received by launch daemon 702 in which context daemon 102 has registered interest.

At step 1910, the computing device can restart context daemon 102. For example, when the context client sends a message to the terminated context daemon 102, the computing device can restart context daemon 102 so that context daemon 102 can receive and handle the message. When launch daemon 702 receives a device state update that corresponds to a request received from context daemon 102, launch daemon 702 can restart context daemon 102.

At step 1912, the computing device can restore registered callback requests to callback daemon 102. For example, once restarted, callback daemon 102 can restore the callback requests received before callback daemon 102 was terminated. For example, callback daemon 102 can restore the previously received callback from the callback predicate database (e.g., predicate database 116).

At step 1914, the computing device can initialize the event monitors required for servicing the restored callback requests. For example, context daemon 102 can load the event monitor bundles 106 necessary for collecting the context information needed to service the callback requests.

At step 1916, the computing device can reestablish the communication session between context daemon 102 and requesting client 126. For example, once context daemon 102 is running again, the requesting client 126 can send a message (e.g., callback request) to context daemon 102 to reestablish the communication session. Context daemon 102 can use the reestablished communication session to send callback notifications to the client according to the predicate specified in the callback request.

Figure 20:
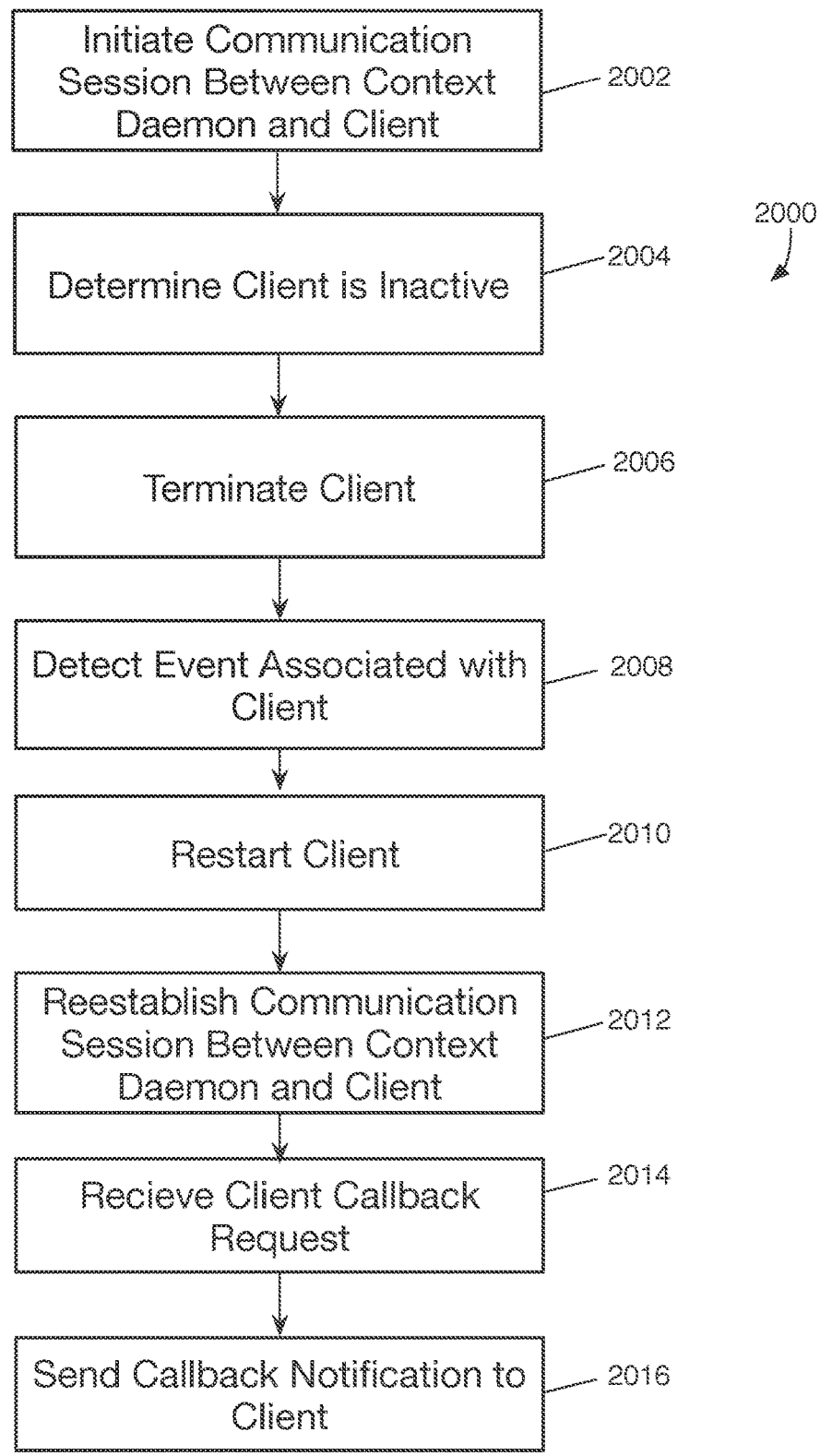
FIG. 20 is a flow diagram of an example process for restarting a callback client to receive a callback notification.

FIG. 20 is a flow diagram of an example process 2000 for restarting a callback client to receive a callback notification. For example, processes running on a computing device can be terminated by a process manager service of the operating system when the process manager determines that the process has been idle for a period of time. When the process manager (or some other process) terminates requesting client 126, the computing device can perform process 1900 to restart requesting client 126 so that requesting client 126 can receive callback notifications from context daemon 102. For example, process 2000 can correspond to the requesting client restart mechanisms described with reference to FIGS. 7-13.

At step 2002, the computing device can initiate a communication session between context daemon 102 and requesting client 126. In some embodiments, requesting client 126 can initiate a communication session with context daemon 102 by sending context daemon 102 a callback request, as described above. The callback request can include a client identifier and a callback predicate, as described above. In some embodiments, context daemon 102 can only communicate (e.g., send a callback notification) with requesting client 126 using a communication session initiated by requesting client 126. In some embodiments, context daemon 102 can store the callback request in a callback predicate database (e.g., predicate database 116).

At step 2004, the computing device can determine that requesting client 126 is inactive. For example, when requesting client 126 is not performing significant processing (e.g., CPU usage for requesting client 126 is below a threshold level) within the computing device, the process manager can determine that requesting client 126 is idle or inactive.

At step 2006, the computing device can shutdown requesting client 126. For example, based on the determination that requesting client 126 is inactive, the process manager can shutdown or terminate requesting client 126 to conserve system resources (e.g., battery power, memory, etc.). Upon shutting down requesting client 126, the communication session between requesting client 126 and context daemon 102 will also be terminated. Thus, context daemon 102 will not have a communication channel by which to deliver callback notifications to requesting client 126.

At step 2008, the computing device can detect an event associated with requesting client 126. For example, context daemon 102 can detect a current context that matches the context callback predicate (e.g., corresponds to the conditions specified by the predicate). Launch daemon 702 can detect a device state that corresponds to a device state request received from context daemon 102 and associated with the client identifier of context client 126.

At step 2010, the computing device can restart requesting client 126. For example, when context daemon 102 detects that the current context matches the context callback predicate, context daemon 102 can attempt to send a callback notification to requesting client 126. However, because the communication session between context daemon 102 and requesting client 126 was terminated, context daemon 102 cannot send the callback notification to the requesting client 126. Thus, upon detecting that the communication channel with requesting client 126 has been terminated, context daemon 102 can send the client identifier received from requesting client 126 to launch daemon 702 in a request to restart requesting client 126. In some embodiments, upon requesting launch daemon 702 restart requesting client 126, context daemon 102 can delete all callback request data (e.g., stored in callback registry 114 and/or predicate database 116) associated with the client identifier of requesting client 126. Upon receiving the client identifier, launch daemon 702 can restart requesting client 126. Alternatively, upon detecting a device state that corresponds to a device state request received from context daemon 102 and associated with the client identifier of context client 126, launch daemon 702 can restart requesting client 126.

At step 2012, the computing device can reestablish a communication session between context daemon 102 and requesting client 126. For example, upon restarting, requesting client 126 can send a new callback request to context daemon 102 to start a new communication session.

At step 2014, the computing device can receive a client callback request from the restarted requesting client 126. For example, context daemon 102 can receive the callback request from requesting client 126 that specifies the same callback predict corresponding to the current context as described at step 2008. Upon receipt of the callback request, context daemon 102 can determine that the callback request corresponds to the current context of the computing device.

At step 2016, the computing device can send a callback notification to requesting client 126. For example, upon determining that the current context matches the callback request, context daemon 102 can send a callback notification to requesting client 126 using the reestablished communication channel.

Figure 21:
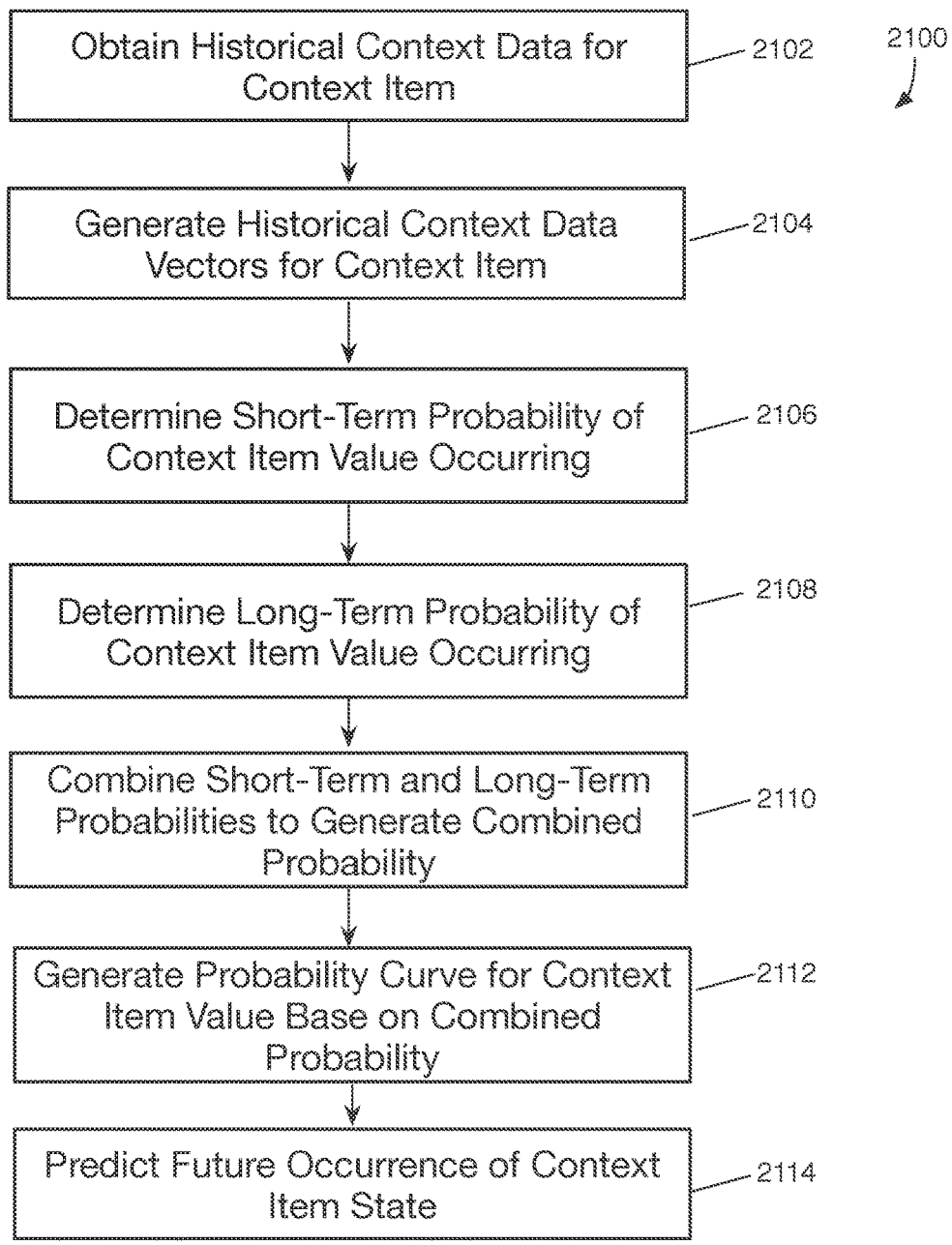
FIG. 21 is a flow diagram of an example process for predicting future events based on historical context information.

FIG. 21 is a flow diagram of an example process 2100 for predicting future events based on historical context information. For example, process 2100 can correspond to the event prediction mechanisms described with reference to FIGS. 14-17.

At step 2102, the computing device can obtain historical context data for a context item. For example, context daemon 102 (e.g., using historical monitor 110) can generate a historical event stream for each context item in current context 112 that indicates changes in device context (e.g., device state) over time. For example, historical monitor 110 can generate a historical event stream for the "locked" context item indicating when the device was locked or unlocked, as described above.

At step 2104, the computing device can generate historical context data vectors for the context item. For example, context daemon 102 can analyze the historical context data for a context item in 24-hour periods over the previous 28 days. For example, context daemon 102 can generate 28 data vectors for each of the 28 previous 24-hour periods. Each of the 28 data vectors can include 96 data entries (e.g., each vector can have a length of 96) corresponding to the 96 15-minute slots in each 24-hour period. Context daemon 102 can assign to each of the 96 15-minute slots a probability value that corresponds to the observed value of the context item (e.g., device state) recorded during each of the 28 previous 24-hour periods (e.g., previous 28 days). For example, context daemon 102 can assign to each of the 96 data slots in the 28 vectors a value (e.g., 0, 1, 0.45, etc.) that indicates the likelihood that the computing device will remain locked during each of the 96 15-minute slots in the previous 28 days.

At step 2106, the computing device can determine a short-term probability that a particular context value will or can occur in each time slot. For example, the short-term probability can be calculated based on data collected over a previous number of days. For example, context daemon 102 can calculate the short-term probability ($P_S$) that the device will remain locked by averaging the 15-minute slots over the previous seven days, as described above in the "Short-Term Averaging" section above.

At step 2108, the computing device can determine a long-term probability that a particular context value will or can occur in each time slot. For example, the long-term probability can be calculated based on data collected on the same day of the week (e.g., Sunday, Wednesday, etc.) over a previous number of weeks. For example, context daemon 102 can calculate the long-term probability ($P_L$) that the device will remain locked by averaging the 15-minute slots over the previous four weeks, as described above in the "Long-Term Averaging" section above.

At step 2110, the computing device can combine the short-term and long-term probabilities to generate a combined probability. For example, context daemon 102 can combine the short-term probability ($P_S$) and the long-term probability ($P_L$) to generate a combined probability (P), as described above. In some embodiments, context daemon 102 can weight the long-term probability (or short-term probability) to adjust the impact that the long-term probability has on the combined probability.

At step 2112, the computing device can generate a probability curve for the context item value. For example, context daemon 102 can convert the slot-wise probability values into a probability curve, as described in the "Generating a Sleep Curve" section above.

At step 2114, the computing device can predict the future occurrence of the particular device context. For example, once the probability curve is generated, context daemon 102 can predict the occurrence of the same context item value in the future based on the probability curve. For example, using the locked context example above, context daemon 102 can predict that the device will remained locked during the hours of 11 pm and 7 am. Based on this locked context item prediction, context daemon 102 can infer that the user will be asleep during this predicted time period.

Figure 22:
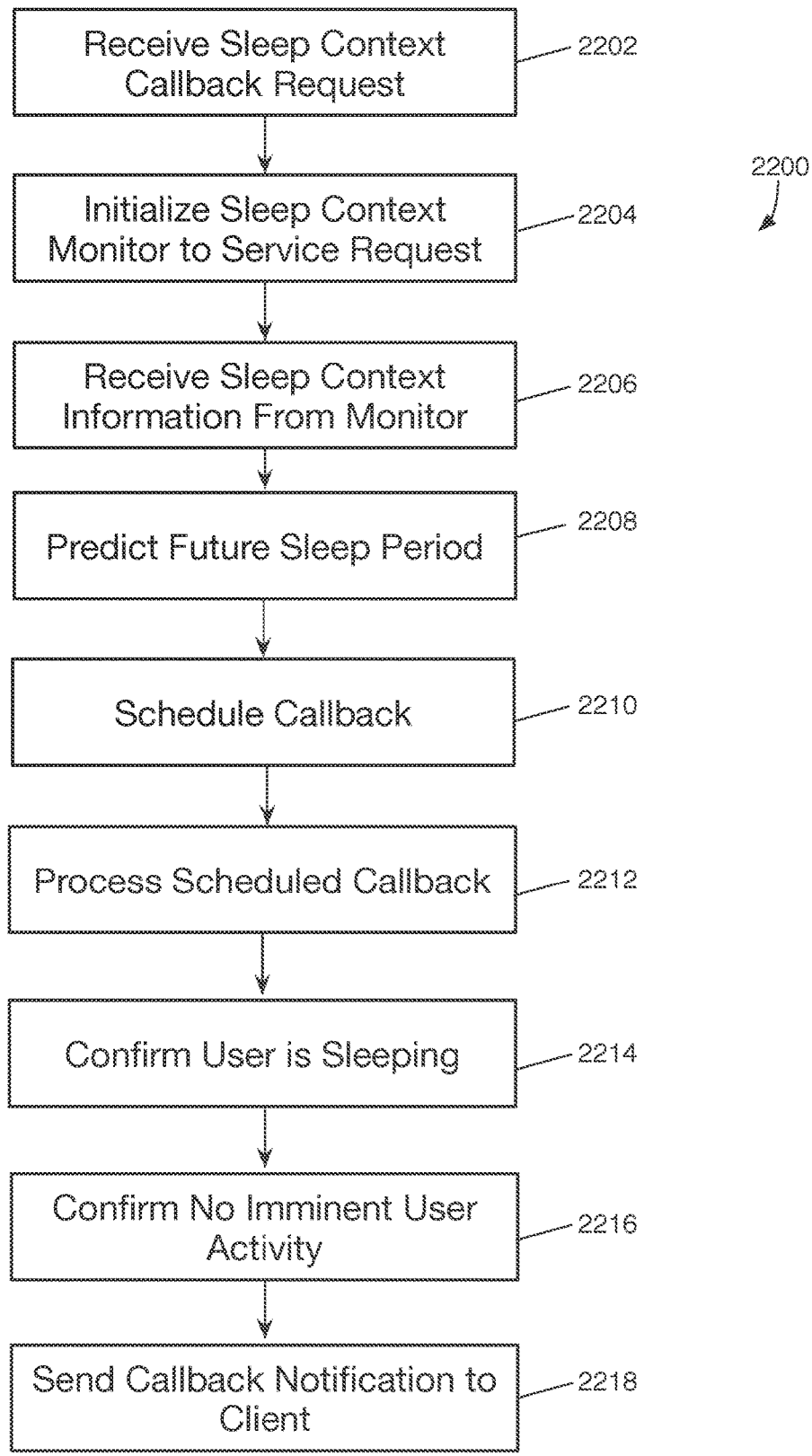
FIG. 22 is a flow diagram of an example process for servicing a sleep context callback request.

FIG. 22 is a flow diagram of an example process 2200 for servicing a sleep context callback request. For example, process 2200 can correspond to the mechanisms described in at least FIG. 21 above. For example, requesting client 126 (e.g., an application, utilities, operating system tool, etc.) can send a callback request to context daemon 102 specifying that context daemon 102 should notify the processes when the user is sleeping. For example, requesting client 126 can be configured to schedule maintenance activities while the user sleeps so that the user is not inconvenienced by these maintenance activities while using the computing device.

At step 2202, the computing device can receive a sleep context callback request. For example, context daemon 102 can receive a callback request from requesting client 126 specifying that context daemon 102 should notify requesting client 126 ten minutes after the user goes to sleep.

At step 2204, the computing device can initialize a sleep context monitor to service the callback request. For example, the sleep context monitor can be a monitor bundle 106 that includes a context monitor 108 configured to monitor the locked state of the computing device. In some instances, context monitor 108 can be configured to monitor the locked state of the computing device and the state of other components associated with the sleep context. For example, context monitor 108 can monitor the state of navigation components, wireless networking components (e.g., personal hotspot. Bluetooth, etc.), device synchronization components, and/or device input/output components (e.g., headphones jack connector, etc.).

At step 2206, the computing device can receive sleep context information from the context monitor. For example, the context monitor 108 can report the locked state of the computing device and/or the state of the other monitored components to context daemon 102.

At step 2208, the computing device can predict a future sleep period. For example, context daemon 102 can predict a future sleep period as described above with reference to FIG. 21.

At step 2210, the computing device can schedule the sleep context callback. For example, if the predicted sleep period is from 11 pm to 7 am and the sleep context callback specifies that requesting client 126 should be called back ten minutes after the sleep period begins, then context daemon 102 can schedule the sleep callback for 11:10 pm.

At step 2212, the computing device can process the scheduled sleep context callback. For example, context daemon 102 can detect when the current time equals the scheduled 11:10 pm time and determine whether to send a callback notification to requesting client 126.

At step 2214, the computing device can determine whether the user is sleeping. For example, context daemon 102 can analyze various context items (e.g., device state) to confirm that the user is sleeping. In some embodiments, context daemon 102 can determine whether the current device locked state indicates that the device is locked. If the device is not locked, context daemon 102 can cancel or delay sending the sleep callback notification to requesting client 126.

In some embodiments, context daemon 102 can determine whether the user is passively using the computing device. For example, the user can be using (e.g., relying upon) the device without providing user input or unlocking the device. If the user is passively using the computing device, context daemon 102 can cancel or delay sending the sleep callback notification to requesting client 126. For example, the user can be using the navigation features of the computing device while the device is locked. Thus, context daemon 102 can determine whether the navigational components (e.g., GNSS system, Wi-Fi and/or cellular data transceivers, etc.) are turned on. If the current context information indicates that these navigational components are powered, then context daemon 102 can determine that the user is passively using the computing device and is not asleep.

As another example of passive use, the user might be using personal hotspot functionality provided by the computing device while the computing device is locked. If the current context information indicates that the personal hotspot components are active, then context daemon 102 can determine that the user is passively using the computing device and is not asleep.

As another example of passive use, the user might have initiated a synchronization operation with another device (e.g., a laptop, tablet computer, smart watch, etc.). The synchronization operation can be performed while the computing device is locked. If the current context information indicates that the computing device is performing a synchronization operation, then context daemon 102 can determine that the user is passively using the computing device and is not asleep.

At step 2216, the computing device can confirm that no imminent user activity is scheduled to occur. For example, the user can in fact be asleep but the computing device can have scheduled a user-visible notification to occur soon that will wake up the user and cause the user to use the computing device. For example, the computing device can have scheduled a reminder about an incoming communication (e.g., text message, instant message, email, telephone call, etc.) that is scheduled to happen soon after the sleep callback notification is scheduled. The computing device can have scheduled an alarm (e.g., an alarm clock app) that is scheduled to happen soon after the sleep callback notification is scheduled. The computing device can have scheduled a calendar reminder or alert that is scheduled to happen soon after the sleep callback notification is scheduled. The computing device can have scheduled a time-to-leave notification that is scheduled to happen soon after the sleep callback notification is scheduled. The computing device can have scheduled an exercise reminder that is scheduled to happen soon after the sleep callback notification is scheduled. If context daemon 102 determines that user activity is scheduled to occur within a threshold period of time (e.g., 1 minute, 5 minutes, etc.), then context daemon 102 can cancel or delay sending the sleep callback notification to requesting client 126.

At step 2212, the computing device can send the sleep callback notification to the client. For example, when context daemon 102 confirms that the user is sleeping at step 2214 and confirms that there is no imminent user activity scheduled at step 2216, context daemon 102 can send the sleep callback notification to requesting client 126.

Example System Architectures

Figure 23A:
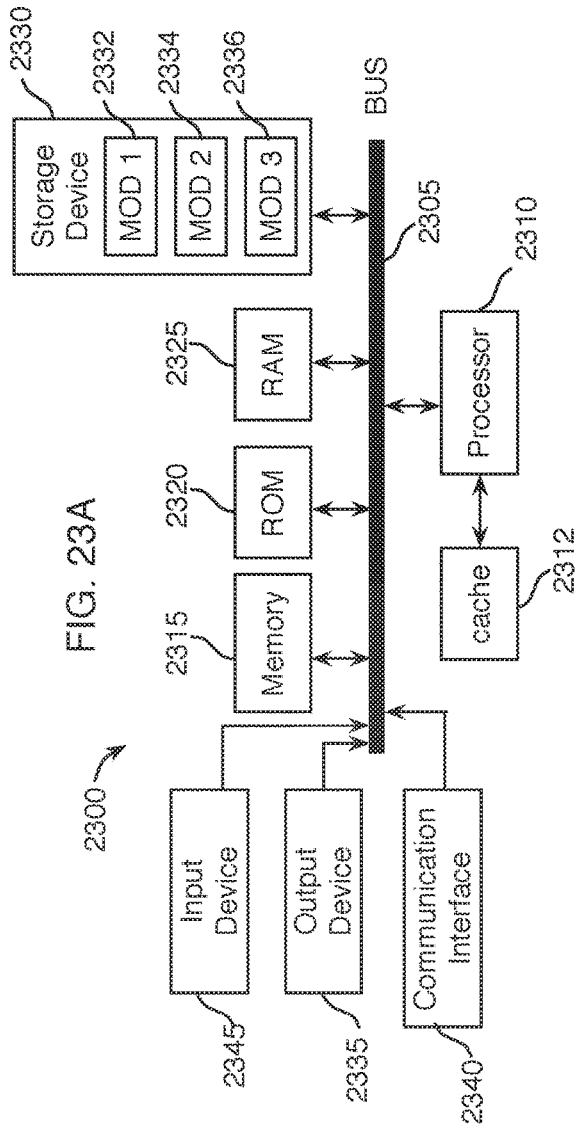
FIG. 23A shows an example system architecture for implementing the various systems and processes described herein.
Figure 23B:
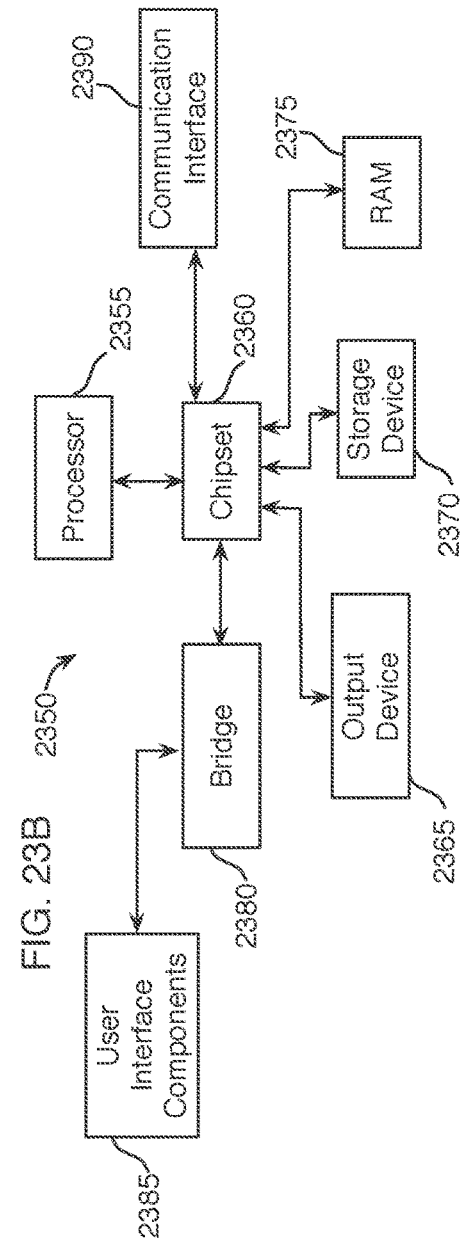
FIG. 23B shows an example system architecture for implementing the various systems and processes described herein.

FIG. 23A and FIG. 23B show example system architectures for implementing the systems and processes described above. The more appropriate architecture will be apparent to those of ordinary skill in the art when implementing the systems and processes described above. Persons of ordinary skill in the art will also readily appreciate that other system architectures are possible.

FIG. 23A illustrates a conventional system bus computing system architecture 2300 wherein the components of the system are in electrical communication with each other using a bus 2305. Example system 2300 includes a processing unit (CPU or processor) 2310 and a system bus 2305 that couples various system components including the system memory 2315, such as read only memory (ROM) 2320 and random access memory (RAM) 2325, to the processor 2310. The system 2300 can include a cache of high-speed memory connected directly with, in close proximity to, or integrated as part of the processor 2310. The system 2300 can copy data from the memory 2315 and/or the storage device 2330 to the cache 2312 for quick access by the processor 2310. In this way, the cache can provide a performance boost that avoids processor 2310 delays while waiting for data. These and other modules can control or be configured to control the processor 2310 to perform various actions. Other system memory 2315 can be available for use as well. The memory 2315 can include multiple different types of memory with different performance characteristics. The processor 2310 can include any general purpose processor and a hardware module or software module, such as module 1 2332, module 2 2334, and module 3 2336 stored in storage device 2330, configured to control the processor 2310 as well as a special-purpose processor where software instructions are incorporated into the actual processor design. The processor 2310 can essentially be a completely self-contained computing system, containing multiple cores or processors, a bus, memory controller, cache, etc. A multi-core processor can be symmetric or asymmetric.

To enable user interaction with the computing device 2300, an input device 2345 can represent any number of input mechanisms, such as a microphone for speech, a touch-sensitive screen for gesture or graphical input, keyboard, mouse, motion input, speech and so forth. An output device 2335 can also be one or more of a number of output mechanisms known to those of skill in the art. In some instances, multimodal systems can enable a user to provide multiple types of input to communicate with the computing device 2300. The communications interface 2340 can generally govern and manage the user input and system output. There is no restriction on operating on any particular hardware arrangement and therefore the basic features here can easily be substituted for improved hardware or firmware arrangements as they are developed.

Storage device 2330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2325, read only memory (ROM) 2320, and hybrids thereof.

The storage device 2330 can include software modules 2332, 2334, 2336 for controlling the processor 2310. Other hardware or software modules are contemplated. The storage device 2330 can be connected to the system bus 2305. In one aspect, a hardware module that performs a particular function can include the software component stored in a computer-readable medium in connection with the necessary hardware components, such as the processor 2310, bus 2305, display 2335, and so forth, to carry out the function.

FIG. 23B illustrates a computer system 2350 having a chipset architecture that can be used in executing the described method and generating and displaying a graphical user interface (GUI). Computer system 2350 is an example of computer hardware, software, and firmware that can be used to implement the disclosed technology. System 2350 can include a processor 2355, representative of any number of physically and/or logically distinct resources capable of executing software, firmware, and hardware configured to perform identified computations. Processor 2355 can communicate with a chipset 2360 that can control input to and output from processor 2355. In this example, chipset 2360 outputs information to output 2365, such as a display, and can read and write information to storage device 2370, which can include magnetic media, and solid state media, for example. Chipset 2360 can also read data from and write data to RAM 2375. A bridge 2380 for interfacing with a variety of user interface components 2385 can be provided for interfacing with chipset 2360. Such user interface components 2385 can include a keyboard, a microphone, touch detection and processing circuitry, a pointing device, such as a mouse, etc. In general, inputs to system 2350 can come from any of a variety of sources, machine generated and/or human generated.

Chipset 2360 can also interface with one or more communication interfaces 2390 that can have different physical interfaces. Such communication interfaces can include interfaces for wired and wireless local area networks, for broadband wireless networks, as well as personal area networks.

Some applications of the methods for generating, displaying, and using the GUI disclosed herein can include receiving ordered datasets over the physical interface or be generated by the machine itself by processor 2355 analyzing data stored in storage 2370 or 2375. Further, the machine can receive inputs from a user via user interface components 2385 and execute appropriate functions, such as browsing functions by interpreting these inputs using processor 2355.

Example systems 2300 and 2350 can have more than one processor (e.g., processor 2310 and/or processor 2355) or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used above to explain aspects within the scope of the appended claims, no limitation of the claims should be implied based on particular features or arrangements in such examples, as one of ordinary skill would be able to use these examples to derive a wide variety of embodiments. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a context daemon executing on a computing device, values corresponding to a first context item monitored by a context monitor;
   generating, by the context daemon, a historical event stream corresponding to the first context item based on the received values;
   determining, by the context daemon, a short-term probability of a particular value of the first context item based on the historical event stream;
   determining, by the context daemon, a long-term probability of the particular value of the first context item based on the historical event stream; and
   predicting, by the context daemon, a future occurrence of the particular value of the first context item based on a combination of the short-term probability and the long-term probability.

2. The method as recited in claim 1, further comprising, prior to receiving the values corresponding to the first context item:
   receiving, by the context daemon from a context client process, a context information request corresponding to the first context item;
   determining, by the context daemon, that the first context item is not currently monitored by any context monitor; and
   initializing, by the context daemon, the context monitor corresponding to the first context item.

3. The method as recited in claim 2, wherein initializing the context monitor comprises dynamically loading a software package corresponding to the context monitor into the context daemon.

4. The method as recited in claim 2, wherein initializing the context monitor comprises invoking a new context monitor process separate from the context daemon, the new context monitor process corresponding to the context monitor.

5. The method as recited in claim 1, further comprising receiving, by the context demon, a plurality of values corresponding to more than one context item monitored by a plurality of context monitors.

6. The method as recited in claim 1, wherein the short-term probability indicates, for each first period of time over a predetermined number of preceding days, a first likelihood of occurrence of the particular value of the first context item, and wherein the long-term probability indicates, for the each first period of time of a same day of the week over a predetermined number of weeks, a second likelihood of occurrence of the particular value of the first context item.

7. The method as recited in claim 1, wherein the received values for the first context item describe a current state of one or more components selected from a group comprising: hardware components of the computing device and software components of the computing device.

8. The method as recited in claim 1, wherein the context monitor generates historical event stream objects that identify a start time, a duration, and a context item value that describes an event in the historical event stream.

9. A non-transitory computer-readable medium comprising instructions that, when executed by a computing device, cause a context daemon of the computing device to:

receive values corresponding to a first context item monitored by a context monitor;

generate a historical event stream corresponding to the first context item based on the received values;

determine a short-term probability of a particular value of the first context item based on the historical event stream;

determine a long-term probability of the particular value of the first context item based on the historical event stream; and predict a future occurrence of the particular value of the first context item based on a combination of the short-term probability and the long-term probability.

10. The non-transitory computer-readable medium as recited in claim 9, further comprising instructions, which when executed, cause the context daemon to, prior to receiving the values corresponding to the first context item:

receive, from a context client process, a context information request corresponding to the first context item;

determine that the first context item is not currently monitored by any context monitor; and initialize the context monitor corresponding to the first context item.

11. The non-transitory computer-readable medium as recited in claim 10, wherein initializing the context monitor comprises dynamically loading a software package corresponding to the context monitor into the context daemon.

12. The non-transitory computer-readable medium as recited in claim 10, wherein initializing the context monitor comprises invoking a new context monitor process separate from the context daemon, the new context monitor process corresponding to the context monitor.

13. The non-transitory computer-readable medium as recited in claim 9, further comprising instructions, which when executed, cause the context daemon to receive a plurality of values corresponding to more than one context item monitored by a plurality of context monitors.

14. The non-transitory computer-readable medium as recited in claim 9, wherein the short-term probability indicates, for each first period of time over a predetermined number of preceding days, a first likelihood of occurrence of the particular value of the first context item, and wherein the long-term probability indicates, for the each first period of time of a same day of the week over a predetermined number of weeks, a second likelihood of occurrence of the particular value of the first context item.

15. The non-transitory computer-readable medium as recited in claim 9, wherein the received values for the first context item describe a current state of one or more components selected from a group comprising: hardware components of the computing device and software components of the computing device.

16. The non-transitory computer-readable medium as recited in claim 9, wherein the context monitor generates historical event stream objects that identify a start time, a duration, and a context item value that describes an event in the historical event stream.

17. A computing device comprising:

one or more hardware processors; and a non-transitory computer-readable medium comprising instructions that, when executed by the one or more hardware processors on the computing device, cause a context daemon to:

receive values corresponding to a first context item monitored by a context monitor;

generate a historical event stream corresponding to the first context item based on the received values;

determine a short-term probability of a particular value of the first context item based on the historical event stream;

determine a long-term probability of the particular value of the first context item based on the historical event stream; and predict a future occurrence of the particular value of the first context item based on a combination of the short-term probability and the long-term probability.

18. The computing device as recited in claim 17, wherein the non-transitory computer-readable medium further comprises instructions, which when executed, cause the context daemon to, prior to receiving the values corresponding to the first context item:

receive, from a context client process, a context information request corresponding to the first context item;

determine that the first context item is not currently monitored by any context monitor; and initialize the context monitor corresponding to the first context item.

19. The computing device as recited in claim 17, wherein the context monitor generates historical event stream objects that identify a start time, a duration, and a context item value that describes an event in the historical event stream.

20. The computing device as recited in claim 17, wherein the received values for the first context item describe a current state of one or more components selected from a group comprising: hardware components of the computing device and software components of the computing device.

* * * * *